(12) United States Patent
Ozawa et al.

(10) Patent No.: US 10,920,096 B2
(45) Date of Patent: Feb. 16, 2021

(54) OIL-BASED INKJET INK AND METHOD FOR PRODUCING OIL-BASED INKJET INK

(71) Applicant: RISO KAGAKU CORPORATION, Tokyo (JP)

(72) Inventors: Shinsuke Ozawa, Ibaraki (JP); Mitsuko Kitanohara, Ibaraki (JP); Hikaru Sugiura, Ibaraki (JP); Yoshifumi Watanabe, Ibaraki (JP); Manami Shimizu, Ibaraki (JP); Naofumi Ezaki, Ibaraki (JP); Tomohiro Matsuzawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 71 days.

(21) Appl. No.: 16/279,583

(22) Filed: Feb. 19, 2019

(65) Prior Publication Data

US 2019/0300737 A1 Oct. 3, 2019

(30) Foreign Application Priority Data

Mar. 28, 2018 (JP) ................................ 2018-061854
Oct. 30, 2018 (JP) ................................ 2018-204133

(51) Int. Cl.
*C09D 11/36* (2014.01)
*C09D 11/328* (2014.01)
*C09D 11/322* (2014.01)
*C09D 11/326* (2014.01)

(52) U.S. Cl.
CPC ............ *C09D 11/36* (2013.01); *C09D 11/322* (2013.01); *C09D 11/326* (2013.01); *C09D 11/328* (2013.01)

(58) Field of Classification Search
None
See application file for complete search history.

(56) References Cited

U.S. PATENT DOCUMENTS

| 7,393,400 | B2* | 7/2008 | Kitawaki | ............... C09D 11/36 |
| | | | | 106/31.66 |
| 2005/0124726 | A1* | 6/2005 | Yatake | ................... C09D 11/40 |
| | | | | 523/160 |
| 2010/0055377 | A1* | 3/2010 | Esaki | ................... G11B 7/2542 |
| | | | | 428/65.1 |
| 2014/0018508 | A1* | 1/2014 | Masubuchi | ......... C08F 290/068 |
| | | | | 526/279 |
| 2015/0050231 | A1* | 2/2015 | Murase | ................ A61K 8/8182 |
| | | | | 424/70.12 |
| 2017/0157974 | A1* | 6/2017 | Kabalnov | ............ B42D 25/387 |

FOREIGN PATENT DOCUMENTS

JP 2007-154149 6/2007

OTHER PUBLICATIONS

TDS KF-6015, Emulsifying Linear Silicone, Oct. 19, 2012 (Year: 2012).*

* cited by examiner

*Primary Examiner* — Peter A Salamon
(74) *Attorney, Agent, or Firm* — Hamre, Schumann, Mueller & Larson, P.C.

(57) ABSTRACT

An oil-based inkjet ink is disclosed that contains a colorant, an oil-soluble resin that is an acrylic-based polymer having a side chain containing a polydimethylsiloxane structure, and a non-aqueous solvent. A method for producing an oil-based inkjet ink is also disclosed.

17 Claims, No Drawings

OIL-BASED INKJET INK AND METHOD FOR PRODUCING OIL-BASED INKJET INK

CROSS REFERENCE TO RELATED APPLICATIONS

This application is based upon and claims the benefit of priority from the prior Japanese Patent Application No. 2018-61854, filed on Mar. 28, 2018, the entire contents of which are incorporated by reference herein, and the prior Japanese Patent Application No. 2018-204133, filed on Oct. 30, 2018, the entire contents of which are incorporated by reference herein.

BACKGROUND OF THE INVENTION

Field of the Invention

Embodiments of the present invention relate to an oil-based inkjet ink and a method for producing an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

In terms of the discharge performance of inkjet inks, JP 2007-154149 A discloses that by using an inkjet non-aqueous ink composition containing a pigment, a dispersant and a non-aqueous solvent, wherein at least 50% of the total weight of the non-aqueous solvent is an ester-based solvent of at least 24 but not more than 36 carbon atoms, superior discharge stability can be obtained.

SUMMARY OF THE INVENTION

One embodiment of the present invention provides an oil-based inkjet ink containing a colorant, an oil-soluble resin that is an acrylic-based polymer having a side chain containing a polydimethylsiloxane structure, and a non-aqueous solvent.

Another embodiment of the present invention provides a method for producing an oil-based inkjet ink that includes: producing a water-in-oil emulsion containing a continuous phase containing a non-aqueous solvent and an oil-soluble resin that is an acrylic-based polymer having a side chain containing a polydimethylsiloxane structure, and a dispersed phase containing water, a colorant and a water-dispersible resin; and removing the water from the water-in-oil emulsion.

DETAILED DESCRIPTION OF THE EMBODIMENTS

Embodiments of the present invention are described below in detail, but the present invention is of course not limited to the following embodiments, and all manner of modifications and alterations are possible.

In the following description, an oil-based inkjet ink is sometimes referred to as simply an "ink" or an "oil-based ink".

In the ink disclosed in JP 2007-154149 A, at least 50% of the total weight of the non-aqueous solvent is an ester-based solvent of at least 24 but not more than 36 carbon atoms, but ester-based solvents having a high carbon number may tend to result in an ink of higher viscosity, and therefore the discharge performance of the ink from the inkjet nozzles leaves room from improvement.

An oil-based inkjet ink of an embodiment of the present invention contains a colorant, an oil-soluble resin that is an acrylic-based polymer having a side chain containing a polydimethylsiloxane structure, and a non-aqueous solvent.

This oil-based inkjet ink may exhibit excellent discharge properties. Although not constrained by any specific theory, the reasons for this are thought to include the following.

A siloxane bond (Si—O—Si) has a larger bond energy, a larger interatomic distance and a larger bond angle than a carbon-carbon bond, and tends to adopt a spiral-like molecular structure. Accordingly, it is thought that in a polydimethylsiloxane structure, the methyl groups are oriented toward the outside of the structure, resulting in reduced intermolecular forces. It is thought that by using an oil-soluble resin that is an acrylic-based polymer having a side chain containing a polydimethylsiloxane structure, this effect enables the viscosity of the ink to be lowered without reducing the molecular weight of the resin. As a result, it is thought that the dispersibility of the colorant and the like provided by the oil-soluble resin can be maintained, while reducing the viscosity of the ink and ensuring favorable discharge performance.

When a printed item prepared using an oil-based ink is inserted in a clear file, and particularly a clear file composed of polypropylene (PP), the ink components of the printed item, and particularly the non-aqueous solvent components, tend to volatilize and make contact with the clear file, and can sometimes cause the inside surface of the clear file to degenerate considerably, and undergo either swelling or shrinking relative to the outside surface of the clear file, resulting in deformation of the clear file.

By using the oil-based inkjet ink of the present embodiment, clear file deformation may also be suppressed.

The ink may contain a pigment, a dye, or a combination thereof as the colorant.

Examples of pigments that can be used include organic pigments, examples thereof including azo pigments, phthalocyanine pigments, polycyclic pigments and dye lake pigments; and inorganic pigments, examples thereof including carbon blacks and metal oxides. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. One of these pigments may be used alone, or a combination of two or more pigments may be used.

The dispersed form of the pigment may be, for example, a dispersion in which the pigment is included in colored resin particles described below, and these colored resin particles are dispersed using a dispersant, or a dispersion in which the pigment dispersant is adsorbed directly to the pigment surface to achieve dispersion. The colored resin particles containing the pigment may be, for example, a so-called encapsulated pigment in which the pigment is coated with an oil-insoluble resin.

From the viewpoints of discharge stability and storage stability, the average particle size of the pigment is preferably not more than 300 nm, more preferably not more than 200 nm, and even more preferably 150 nm or less.

The amount of the pigment is typically from 0.01 to 20% by mass relative to the total mass of the ink, and from the viewpoints of print density and ink viscosity, is preferably from 1 to 15% by mass, and more preferably from 5 to 10% by mass.

For the dye, any of the dyes typically used in this technical field may be used. For example, an oil-soluble dye may be used, and examples of such oil-soluble dyes include azo dyes, metal complex salt dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metal phthalocyanine dyes. One of these dyes may be used alone, or a combination of a plurality of dyes may be used.

The amount of the dye is typically from 0.01 to 20% by mass relative to the total mass of the ink, and from the viewpoints of image density and ink viscosity, is preferably from 1 to 15% by mass, and more preferably from 5 to 10% by mass.

From the viewpoint of reducing roller transfer contamination, the ink preferably contains colored resin particles containing the colorant and a resin (hereafter sometimes referred to as simply "colored resin particles"). In inkjet printing, when a printed item is transported inside the inkjet printer immediately following printing, the ink on the freshly printed item can sometimes adhere to the surface of a roller in the inkjet printer, such as a drive roller or a driven roller, and this ink may then be transferred from the roller surface and adhere to a subsequently transported recording medium, causing contamination ("roller transfer contamination"). By using an ink containing colored resin particles containing the colorant and a resin, roller transfer contamination may be reduced.

The colored resin particles may contain a pigment, a dye, or a combination thereof as the colorant.

In those cases in which the colored resin particles contain a pigment, the pigment contained within the colored resin particles may be a single pigment, or a combination of two or more pigments, selected from among the pigments described above.

For example, when an oil-based inkjet ink containing colored resin particles is produced using a method that employs in-oil drying of a water-in-oil (W/O) emulsion, the pigment is preferably used in the form of water dispersion in which the pigment is dispersed in water. A self-dispersing pigment obtained by bonding a water-solubilizing group such as a carboxyl group, carbonyl group, hydroxyl group or sulfo group to the pigment surface, thereby enabling the pigment itself to undergo dispersion in water, may be used. For example, a water dispersion of a self-dispersing pigment can be used favorably. Further, it is also preferable to disperse the pigment in water using a pigment dispersant such as a water-soluble nonionic dispersant described below. In those cases in which a water dispersion is used, the water contained in the water dispersion is preferably removed during the ink production process.

In those cases in which the colored resin particles contain a dye, from the viewpoint of reducing strike-through, the dye contained in the colored resin particles is preferably either difficult to dissolve or insoluble in the non-aqueous solvent contained in the ink, and in those cases in which the oil-based inkjet ink is produced using a method that employs in-oil drying of a water-in-oil (W/O) emulsion, the use of a dye that is soluble or dispersible in water is preferred.

Examples of dyes that can be used favorably as the dye contained in the colored resin particles include water-soluble dyes and dyes that can be made water-soluble upon reduction or the like, selected from among basic dyes, acid dyes, direct dyes, soluble vat dyes, acid mordant dyes, mordant dyes, reactive dyes, vat dyes and sulfide dyes. Further, dispersible dyes, examples thereof including azo-based dyes, anthraquinone-based dyes, azomethine-based dyes and nitro-based dyes, can also be used favorably. One of these dyes may be used alone, or a combination of a plurality of dyes may be used.

Examples of the resin included in the colored resin particles include urethane resins, polyester resins, (meth)acrylic resins, (meth)acrylic-silicone resins, vinyl chloride resins, and styrene-(meth)acrylic resins. Among these, from the viewpoint of reducing roller transfer contamination, urethane resins and (meth)acrylic resins are preferred, and urethane resins are particularly desirable.

A urethane resin has a urethane group. The urethane groups of the urethane resin may be generally obtained by reaction of a polyol and a polyisocyanate, and from the viewpoint of the storage stability of the urethane resin, an aliphatic polyisocyanate is preferably used as the polyisocyanate. From the viewpoint of reducing roller transfer contamination, the urethane resin is preferably a urethane-urea resin that has a urea group in addition to the urethane group.

Examples of the urethane resin also include urethane-(meth)acrylic resins, but these resins are also included in the example of (meth)acrylic resins.

The term "(meth)acrylic" means methacrylic, acrylic, or a combination thereof. A (meth)acrylic resin means a resin containing a methacrylic unit, a resin containing an acrylic unit, or a resin containing both these units.

The resin included in the colored resin particles may be an acidic resin, a basic resin or a nonionic resin, but from the viewpoints of reducing roller transfer contamination and achieving favorable ink storage stability, an acidic resin is preferred. The acidic resin may be a resin having an acidic functional group. The acidic resin may be a resin obtained using an acidic water-dispersible resin as a raw material during production of the ink. The acidic resin is preferably a resin having an acidic functional group. Examples of the acidic functional group include a carboxyl group and a sulfo group.

The resin included in the colored resin particles is preferably an acidic urethane resin or an acidic (meth)acrylate resin, is more preferably an acidic urethane resin, and is even more preferably an acidic urethane-urea resin.

The resin included in the colored resin particles exhibits a degree of solubility in the non-aqueous solvent of the ink, expressed as the mass of the resin that can be dissolved in 100 g of the ink non-aqueous solvent at 23° C., that is preferably 1 g or less. If the solubility of the resin in the non-aqueous solvent is lowered, then it is thought that when the non-aqueous solvent penetrates into the interior of the recording medium, the colored resin particles more readily separate from the non-aqueous solvent and are more readily to be retained at the surface of the recording medium. Accordingly, when the solubility in the non-aqueous solvent of the ink is a value of not more than 1 g of the resin per 100 g of the ink non-aqueous solvent at 23° C., a reduction in strike-through and improved image density tend to be more easily obtainable. Moreover, ensuring that the resin is only sparingly soluble in the non-aqueous solvent may also contribute to a reduction in the ink viscosity.

The weight average molecular weight of the resin included in the colored resin particles may vary depending on the type of resin used, but for example, is preferably from 5,000 to 200,000, and more preferably from 10,000 to 150,000. For example, the weight average molecular weight of a urethane resin is preferably from 5,000 to 50,000, and more preferably from 10,000 to 30,000. The weight average molecular weight of a (meth)acrylic resin is preferably from 10,000 to 200,000, and more preferably from 30,000 to 150,000.

The weight average molecular weight of the resin refers to a value determined by the GPC method relative to standard polystyrenes.

For example, in cases in which in-oil drying of a water-in-oil (W/O) emulsion is used to produce an oil-based inkjet ink containing colored resin particles, a water-dispersible resin is preferably used to form the resin included in the resin particles. The water-dispersible resin is preferably added during production of the ink, for example in the form of a dispersion in which the water-dispersible resin has been dispersed in advance in a liquid such as water (an oil-in-water (O/W) resin emulsion). When a water dispersion is used, the water contained in the water dispersion is preferably removed during the ink production process.

The water-dispersible resin may be a resin that has a hydrophilic functional group, such as a self-emulsifying resin, or may be a resin that has been to subjected to a surface treatment such as adhering a hydrophilic dispersant to the surface of the resin particles.

An acidic water-dispersible resin is preferably used as the water-dispersible resin. The acidic water-dispersible resin may be a resin in which the acidic functional groups of the resin exist at the surface of the particles, such as a self-emulsifying resin, or may be a resin that has been to subjected to a surface treatment such as adhering an acidic dispersant to the surface of the resin particles. In those cases in which the colored resin particles include an acidic resin, the acidic resin included in the colored resin particles may be obtained using either of the above types of resin. Representative examples of the acidic functional group include a carboxyl group and a sulfo group. Examples of the acidic dispersant include anionic surfactants.

Examples of commercially available water dispersions of water-dispersible urethane resins include WS5984 (a product name) manufactured by Mitsui Chemicals, Inc., and SUPERFLEX 150H (a product name) manufactured by DKS Co., Ltd., examples of commercially available water dispersions of water-dispersible urethane-(meth)acrylic resins include DAOTAN VTW1265 (a product name) manufactured by Daicel Allnex Ltd., and examples of commercially available water dispersions of water-dispersible (meth)acrylic resins include Mowinyl 6750 (a product name) manufactured by Japan Coating Resin Co., Ltd. The urethane resins WS5984, SUPERFLEX 150H and DAOTAN VTW1265 are all urethane-urea resins that also have a urea group.

In the colored resin particles, one of these resins may be used alone, or a combination of two or more resins may be used.

The amount of resin included in the colored resin particles may be altered as desired.

The amount of the resin included in the colored resin particles, relative to the total mass of the ink, is preferably at least 0.1% by mass, more preferably at least 0.5% by mass, even more preferably at least 1% by mass, and still more preferably 3% by mass or greater. On the other hand, the amount of the resin included in the colored resin particles, relative to the total mass of the ink, is preferably not more than 30% by mass, more preferably not more than 20% by mass, even more preferably not more than 15% by mass, and still more preferably 10% by mass or less. The amount of the resin included in the colored resin particles relative to the total mass of the ink is, for example, preferably from 0.1 to 30% by mass, more preferably from 0.5 to 20% by mass, even more preferably from 1 to 15% by mass, and still more preferably from 3 to 10% by mass.

The amount of the resin included in the colored resin particles, relative to the total mass of the colored resin particles, is preferably at least 1% by mass, more preferably at least 5% by mass, even more preferably at least 10% by mass, and still more preferably 20% by mass or greater. On the other hand, the amount of the resin included in the colored resin particles, relative to the total mass of the colored resin particles, is preferably not more than 70% by mass, more preferably not more than 60% by mass, and even more preferably 50% by mass or less. The amount of the resin included in the colored resin particles relative to the total mass of the colored resin particles is, for example, preferably from 1 to 70% by mass, more preferably from 5 to 70% by mass, even more preferably from 10 to 60% by mass, and still more preferably from 20 to 50% by mass.

The amount of the resin included in the colored resin particles, expressed as a mass ratio relative to the amount of the colorant in the colored resin particles, is preferably from 0.1 to 2.0, and more preferably from 0.2 to 1.0.

In those cases in which the colored resin particles contain a pigment, the colored resin particles preferably also contain a pigment dispersant for dispersing the pigment during the ink production process or the like. As described above, when an oil-based inkjet ink containing colored resin particles that include a pigment as the colorant are produced by a method that employs in-oil drying of a water-in-oil (W/O) emulsion, the type of pigment dispersant mentioned above is preferably used to disperse the pigment in water during the ink production process. It is preferable that the colorant of the colored resin particles includes a pigment, and it is also preferable that the colored resin particles also contain a pigment dispersant.

Examples of such a pigment dispersant that may be included in the colored resin particles include water-soluble basic (cationic) dispersants, water-soluble acidic (anionic) dispersants, and water-soluble nonionic dispersants. For example, when the oil-based inkjet ink is produced by a method that employs in-oil drying of a water-in-oil (W/O) emulsion, a water-soluble nonionic dispersant is preferred.

A water-soluble nonionic dispersant is a dispersant in which the hydrophilic groups do not have ion dissociability. Examples of the water-soluble nonionic dispersant, described in terms of the main bonds within the molecule, include ester-based water-soluble nonionic dispersants, ether-based water-soluble nonionic dispersants, and ester-ether-based water-soluble nonionic dispersants.

Ester-based water-soluble nonionic dispersants, for example, have a structure in which a polyhydric alcohol such as glycerol, sorbitol or sucrose and a fatty acid have reacted to form an ester linkage, and specific examples include glycerol fatty acid esters, sorbitan fatty acid esters, and sucrose fatty acid esters.

Ether-based water-soluble nonionic dispersants can be produced, for example, by adding mainly ethylene oxide to a raw material having a hydroxyl group such as a higher alcohol, alkylphenol, arylphenol or arylalkylphenol, and examples include polyglycol ethers (such as aryl polyglycol ethers and alkyl polyglycol ethers). More specific examples include polyoxyethylene alkyl ethers, polyoxyethylene alkyl phenyl ethers, polyoxyethylene aryl phenyl ethers, and polyoxyethylene arylalkyl phenyl ethers.

Ester-ether-based water-soluble nonionic dispersants are compounds obtained, for example, by adding ethylene oxide to an ester formed from a polyhydric alcohol such as glycerol or sorbitol and a fatty acid. These compounds have both ester linkages and ether linkages within the molecule. Examples include fatty acid polyethylene glycol ether esters.

Examples of the water-soluble nonionic dispersant further include polycarboxylate polymers and polysiloxane copolymers.

One of these water-soluble nonionic dispersants may be used alone, or a combination of two or more dispersants may be used.

Fatty acid polyethylene glycol ether esters and polyglycol ethers (such as aryl polyglycol ethers) and the like are particularly preferred as the water-soluble nonionic dispersant.

It is thought that by using a water-soluble nonionic dispersant, the pigment can be dispersed more finely during the ink production process, and because this enables the pigment to be coated efficiently with a polymer compound, the particle size of the colored resin particles can be better controlled, and the image density can be improved.

Further, when a water-soluble nonionic dispersant is used, in those cases in which the resin included in the colored resin particles is an acidic resin, pigment aggregation can be more easily prevented, and an ink having superior storage stability tends to be able to be produced.

Examples of commercially available water-soluble nonionic dispersants include Borchi Gen DFN (a product name) (an aryl alkyl biphenylol polyglycol ether) and Borchi Gen 12 (a product name) (a fatty acid polyethylene glycol ether ester) manufactured by OMG Borchers GmbH.

The colored resin particles may contain either one, or a combination of two or more, of these pigment dispersants.

The amount of these pigment dispersants within the colored resin particles may be set as appropriate. For example, the mass ratio relative to a value of 1 for the pigment may be within a range from 0.1 to 5, and is preferably from 0.1 to 1. The amount of these pigment dispersants relative to the total mass of the ink is typically from 0.01 to 10% by mass, and is preferably from 0.01 to 5% by mass.

When the colored resin particles include a water-soluble nonionic dispersant, the amount of the water-soluble nonionic dispersant, relative to the total mass of all the pigment dispersants within the colored resin particles, is preferably from 50 to 100% by mass, and more preferably from 70 to 100% by mass. The amount of the water-soluble nonionic dispersant, expressed as a mass ratio relative to a value of 1 for the pigment, may be within a range from 0.1 to 5, and is preferably from 0.1 to 1. The amount of the water-soluble nonionic dispersant relative to the total mass of the ink is typically from 0.01 to 10% by mass, and is preferably from 0.01 to 5% by mass.

When the ink contains colored resin particles, the average particle size of the colored resin particles in the ink is preferably from 50 to 300 nm, and more preferably from 80 to 200 nm. The amount of colored resin particles in the ink, expressed as an amount of the solid fraction of the colored resin particles relative to the total mass of the ink, is preferably from 1 to 40% by mass, and more preferably from 5 to 30% by mass.

The average particle size of the colored resin particles represents the volume-based average particle size determined by a dynamic scattering method, and can be measured, for example, using a dynamic light scattering particle size distribution analyzer LB-500 manufactured by Horiba, Ltd.

The ink preferably contains an oil-soluble resin that is an acrylic-based polymer having a side chain containing a polydimethylsiloxane structure. This oil-soluble resin that is an acrylic-based polymer having a side chain containing a polydimethylsiloxane structure can function as a dispersant to favorably disperse the colorant such as a pigment and the colored resin particles and the like within the ink. The acrylic-based polymer may be a polymer containing a methacrylic unit, a polymer containing an acrylic unit, or a polymer containing both these units.

The oil-soluble resin is a resin that dissolves in the solvent contained in the oil-based ink, and specifically, this means that when equal volumes of the resin and the non-aqueous solvent contained in the oil-based ink are mixed together at 1 atmosphere and 20° C., the two compounds can dissolve uniformly without separating into two phases.

The oil-soluble resin that is an acrylic-based polymer having a side chain containing a polydimethylsiloxane structure is sometimes referred to as the "oil-soluble resin A".

The ink may contain a single oil-soluble resin A, or may contain a combination of two or more such resins.

Examples of the polydimethylsiloxane structure contained in the side chain of the oil-soluble resin A include structures represented by the formula shown below.

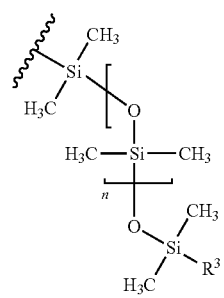

In the above formula, n is 0 or greater, and is preferably from 0 to 100, and more preferably from 1 to 30. $R^3$ represents an alkyl group.

The oil-soluble resin A is an acrylic-based polymer, and may be either a homopolymer or a copolymer.

When the oil-soluble resin A is a copolymer, there are no particular limitations on the form of the copolymer. For example, the oil-soluble resin may be a random polymer, or a block polymer or the like.

The oil-soluble resin A is preferably an acrylic-based polymer prepared using a copolymer of a monomer mixture. The acrylic-based polymer prepared using a copolymer of a monomer mixture may be, for example, a copolymer of the monomer mixture, or may be, for example, a copolymer in which a side chain is added to a copolymer of the monomer mixture. The monomer mixture preferably contains at least one monomer selected from the group consisting of monomers a to g described below, and more preferably contains at least one monomer selected from the group consisting of the monomers a to e. In one embodiment, the monomer mixture may contain a monomer having a group containing a polydimethylsiloxane structure (the monomer a described below). In another embodiment, a side chain containing a polydimethylsiloxane structure may be bonded to a copolymer of the monomer mixture.

The oil-soluble resin A preferably has an alkyl group of 8 to 18 carbon atoms. Alkyl groups of 8 to 18 carbon atoms may exhibit superior compatibility with a petroleum-based hydrocarbon solvent, which is a non-aqueous solvent as described below. The number of carbon atoms in the alkyl group of 8 to 18 carbon atoms is more preferably from 12 to 18.

The alkyl group of 8 to 18 carbon atoms may be linear or branched. Specific examples of the alkyl group of 8 to 18 carbon atoms include an octyl group, a nonyl group, a decyl group, a dodecyl group, a tridecyl group, a tetradecyl group, a pentadecyl group, a hexadecyl group, a heptadecyl group, an octadecyl group and a ethylhexyl group. The oil-soluble resin A may contain only one type of the alkyl group of 8 to 18 carbon atoms, or may contain a plurality types thereof in combination.

From the viewpoint of reducing the ink viscosity, the oil-soluble resin A preferably has a β-dicarbonyl group. Preferred examples of the β-dicarbonyl group include β-diketone groups such as an acetoacetyl group or a propionacetyl group, and β-keto acid ester groups such as an acetoacetoxy group or a propionacetoxy group. The resin may include only one type of the β-dicarbonyl groups, or may include a plurality of different types thereof in combination. A β-dicarbonyl group is also a functional group capable of reacting with an amino group which is described below.

The oil-soluble resin A preferably has a functional group capable of reacting with an amino group. A functional group capable of reacting with an amino group can be used, by reaction with an amino alcohol or the like, to form a side chain containing a urethane linkage described below. A functional group capable of reacting with an amino group can also be used, for example by reaction with a basic compound, to introduce a basic group described below. On the other hand, it is thought that an unreacted functional group capable of reacting with an amino group can also function as a pigment adsorption group. Preferable examples of the functional group capable of reacting with an amino group include an epoxy group, a vinyl group, a (meth) acryloyl group, a isocyanate group and a β-dicarbonyl groups, which is described above. More preferable examples of the functional group capable of reacting with an amino group include an epoxy group and a β-dicarbonyl group. The epoxy group may be one portion of a glycidyl group. The resin may have only one type of the functional group capable of reacting with an amino group, or may include a plurality of different types thereof in combination.

The oil-soluble resin A preferably has an aromatic ring-containing group. The aromatic ring-containing group preferably has a benzene ring. Examples of the aromatic ring-containing group include a benzyl group and a phenyl group. It is thought that aromatic ring-containing groups may function as pigment adsorption groups. The resin may contain only one type of these aromatic ring-containing groups, or may contain a plurality of different types thereof in combination.

The oil-soluble resin A may have a side chain containing a urethane linkage. For example, the oil-soluble resin A may have a side chain containing a urethane linkage in addition to the side chain containing a polydimethylsiloxane structure. The side chain containing the polydimethylsiloxane structure may be, for example, grafted using a urethane linkage. Examples of this type of side chain include side chains in which the polydimethylsiloxane structure is bonded via a linking group containing a urethane linkage.

The oil-soluble resin A may have a basic group. In those cases in which the ink includes colored resin particles containing a colorant and a resin, from the viewpoint of improving the dispersion stability of the colored resin particles, the oil-soluble resin A preferably contains a basic group.

Examples of the basic group include an amino group, an amide group, an imino group, a pyrrolidone group, a morpholino group and a nitrile group. Examples of the amino group include an unsubstituted amino group, and a substituted amino group. Examples of the substituted amino group include mono- or di-alkyl amino groups (such as a dimethylamino group). In the substituted amino group, for example, a substituent such as an alkyl group may be further substituted with a substituent such as a hydroxyl group or an aryl group. Similarly, examples of the amide group include an unsubstituted amide group, and a substituted amide group. Examples of the substituted amino group include mono- or di-alkyl amide groups (such as a dimethylamide group). In the substituted amide group, for example, a substituent such as an alkyl group may be further substituted with a substituent such as a hydroxyl group or an aryl group. The oil-soluble resin A may contain only one type of basic group, or may contain two or more types thereof in combination.

The oil-soluble resin A may, for example, also contain an alkyl group of 19 or more carbon atoms, and the like. The alkyl group of 19 or more carbon atoms is preferably an alkyl group of 19 to 22 carbon atoms. Examples of alkyl group of 19 or more carbon atoms include a nonadecyl group, an eicosyl group, a heneicosyl group and a docosyl group. The oil-soluble resin A may contain only one type of alkyl group of 19 or more carbon atoms, or may contain two or more types thereof in combination.

In those cases in which the oil-soluble resin A has a basic group, the oil-soluble resin A may also have one type of group, or two or more types of groups, selected from the group consisting of alkyl groups of 8 to 18 carbon atoms, β-dicarbonyl groups, functional groups capable of reacting with an amino group, aromatic ring-containing groups, and alkyl groups of 19 or more carbon atoms and the like. For example, in one embodiment, from the viewpoint of reducing the ink viscosity, the oil-soluble resin A preferably has a basic group and at least one selected from the group consisting of an alkyl group of 8 to 18 carbon atoms and a β-dicarbonyl group, and more preferably has a basic group, an alkyl group of 8 to 18 carbon atoms and a β-dicarbonyl group. These groups may be included within a single structural unit, or may be included within mutually different structural units, and are preferably included in different structural units.

The oil-soluble resin A may be preferably a resin that contains a structural unit having a side chain containing a polydimethylsiloxane structure, and also contains at least one type of structural unit selected from the group consisting of structural units having an alkyl group of 8 to 18 carbon atoms, structural units having a β-dicarbonyl group, and structural units having a functional group capable of reacting with an amino group. For example, the oil-soluble resin A may have a structural unit having a side chain containing a polydimethylsiloxane structure, as well as a structural unit having a side chain containing a urethane linkage. In the oil-soluble resin A, for example, the structural unit having a side chain containing a polydimethylsiloxane structure may have a urethane linkage within the side chain containing the polydimethylsiloxane structure, and examples of this type of side chain include a side chain in which the polydimethylsiloxane structure is bonded via a linking group containing a urethane linkage.

The oil-soluble resin A may contain a structural unit having a basic group. In those cases in which the ink includes colored resin particles containing a colorant and a resin, from the viewpoint of improving the dispersion stability of the colored resin particles, the oil-soluble resin A preferably contains a structural unit having a basic group.

For example, the oil-soluble resin A may be a resin containing a structural unit having a side chain containing a polydimethylsiloxane structure, and a structural unit having a basic group, and, in such cases, it is preferable that the oil-soluble resin A further contains at least one type of structural unit selected from the group consisting of structural units having an alkyl group of 8 to 18 carbon atoms, structural units having a β-dicarbonyl group, and structural units having a functional group capable of reacting with an amino group. The oil-soluble resin A more preferably contains a structural unit having a side chain containing a polydimethylsiloxane structure, a structural unit having a basic group, and at least one type of structural unit selected from the group consisting of structural units having an alkyl group of 8 to 18 carbon atoms and structural units having a β-dicarbonyl group, and even more preferably contains a structural unit having a side chain containing a polydimethylsiloxane structure, a structural unit having a basic group, a structural unit having an alkyl group of 8 to 18 carbon atoms, and a structural unit having a β-dicarbonyl group.

The structural unit having a basic group may be, for example, a unit derived from a monomer having a basic group described below, but may also be obtained, for example, by reacting a basic compound with the functional group capable of reacting with an amino group contained within a unit or the like having the functional group capable of reacting with an amino group.

The oil-soluble resin A may be, for example, an acrylic-based polymer obtained by polymerizing a monomer having a group containing a polydimethylsiloxane structure (hereafter sometimes referred to as "monomer a"), or may be, for example, an acrylic-based polymer that is a copolymer of a monomer mixture containing the monomer a and one or more other monomers. Examples of the other monomers include a monomer having an alkyl group of 8 to 18 carbon atoms (hereafter sometimes referred to as "monomer b"), a monomer having a β-dicarbonyl group (hereafter sometimes referred to as "monomer c"), a monomer having a functional group capable of reacting with an amino group (hereafter sometimes referred to as "monomer d"), a monomer having an aromatic ring-containing group (hereafter sometimes referred to as "monomer e"), a monomer having a basic group (hereafter sometimes referred to as "monomer f"), and a monomer having an alkyl group of 19 or more carbon atoms (hereafter sometimes referred to as "monomer g"), and the one or more other monomers may include at least one monomer selected from the group consisting of the above monomers (for example, at least one monomer selected from the group consisting of the monomers b to e, or at least one monomer selected from the group consisting of the monomers b to g). The alkyl group of 8 to 18 carbon atoms, the β-dicarbonyl group, the functional group capable of reacting with an amino group, the aromatic ring-containing group, the basic group, and the alkyl group of 19 or more carbon atoms are as described above.

Examples of the oil-soluble resin A include acrylic-based polymers obtained using a copolymer of a monomer mixture containing at least one monomer selected from the group consisting of the monomers a to e; acrylic-based polymers obtained using a copolymer of a monomer mixture containing the monomer a, the monomer b, and at least one monomer selected from the group consisting of the monomer c and the monomer d; and acrylic-based polymers obtained using a copolymer of a monomer mixture containing the monomer a, the monomer b, at least one monomer selected from the group consisting of the monomer c and the monomer d, and the monomer f.

As the monomer a, for example, a (meth)acrylic monomer having a polydimethylsiloxane structure such as a (meth)acrylate having a group containing a polydimethylsiloxane structure, or the like can be used favorably. Examples include compounds having a polydimethylsiloxane structure bonded to a (meth)acryloyloxy group, either directly or via a linking group (for example, a (meth)acrylic-modified silicone oil such as a methacrylic-modified silicone oil). There are no particular limitations on the linking group, and examples of the linking group include an alkylene group and the like, but an alkylene group of 2 to 6 carbon atoms is preferred, and an alkylene group of 2 to 4 carbon atoms is even more preferred.

Examples of the monomer a include compounds represented by the formula shown below. In the following formula, x is preferably from 2 to 6, and more preferably from 2 to 4. In the following formula, n is 0 or greater, and is preferably from 0 to 100, and more preferably from 1 to 30. $R^1$ represents a hydrogen atom or a methyl group. In the following formula, $R^{1'}$ represents an alkyl group.

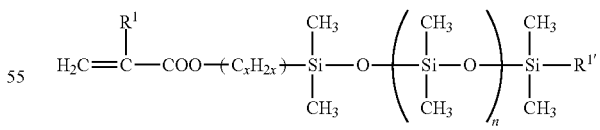

Examples of commercially available products that may be used as the monomer a include the products X-22-2404, X-22-174ASX and X-22-174BX manufactured by Shin-Etsu Chemical Co., Ltd. The term "(meth)acryloyloxy group" includes both an "acryloyloxy group" and a "methacryloyloxy group". The term "(meth)acrylate" includes both "methacrylate" and "acrylate". A single monomer a may be used alone, or a combination of two or more monomers a may be used in combination.

As the monomer b, for example, an alkyl (meth)acrylate having an alkyl group of 8 to 18 carbon atoms or the like can be used favorably. Examples of preferred alkyl (meth)acrylates having an alkyl group of 8 to 18 carbon atoms include palmityl (meth)acrylate, cetyl (meth)acrylate, dodecyl (meth)acrylate, 2-ethylhexyl (meth)acrylate and stearyl (meth)acrylate. A single monomer b may be used alone, or a combination of two or more monomers b may be used.

As the monomer c, for example, a (meth)acrylate having a β-dicarbonyl group, a (meth)acrylamide having a β-dicarbonyl group or the like can be used favorably. Preferred examples include (meth)acrylates containing a β-diketone group or a β-keto acid ester group in the ester chain, and (meth)acrylamides containing a β-diketone group or a β-keto acid ester group in the amide chain. More specific examples include acetoacetoxy alkyl (meth)acrylates such as acetoacetoxy ethyl (meth)acrylate, hexadione (meth)acrylate, and acetoacetoxy alkyl (meth)acrylamides such as acetoacetoxy ethyl (meth)acrylamide. One of these compounds may be used alone, or a combination of two or more compounds may be used. The term "(meth)acrylamide" includes both "methacrylamide" and "acrylamide".

As the monomer d, for example, a (meth)acrylate having a glycidyl group, a (meth)acrylate having a vinyl group, a (meth)acrylate having a (meth)acryloyl group, a (meth)acrylate having an isocyanate group or the like can be used favorably. The compounds described above as examples of the monomer c are also included in examples of the monomer d. Examples of preferred (meth)acrylates having a glycidyl group include glycidyl (meth)acrylate and 4-hydroxybutyl acrylate glycidyl ether. Examples of preferred (meth)acrylates having a vinyl group include vinyl (meth)acrylate and 2-(2-vinyloxyethoxy)ethyl (meth)acrylate. Examples of (meth)acrylates having a (meth)acryloyl group include dipropylene glycol di(meth)acrylate and 1,6-hexanediol (meth)acrylate. Examples of (meth)acrylates having an isocyanate group include 2-isocyanatoethyl (meth)acrylate. A single monomer d may be used alone, or a combination of two or more monomers d may be used.

As the monomer e, for example, a (meth)acrylate having an aromatic ring-containing group or the like can be used favorably, and examples include benzyl (meth)acrylate. A single monomer e may be used alone, or a combination of two or more monomers e may be used.

A (meth)acrylate having a basic group, a (meth)acrylamide, or a (meth)acryloylmorpholine or the like can be used as the monomer f, and specific examples include dimethylaminoethyl (meth)acrylate, diethylaminoethyl (meth)acrylate, (meth)acryloylmorpholine, dimethyl (meth)acrylamide and dimethylaminopropyl (meth)acrylamide. A single monomer f may be used alone, or a combination of two or more monomers f may be used.

A compound obtained by adding a basic compound to the monomer c or the monomer d may also be used as the monomer f. The added basic compound is preferably an amine compound having a hydroxyl group (such as an alkanolamine). Examples of the amine compound having a hydroxyl group include benzylethanolamine, monoethanolamine, and diethanolamine. A secondary amine compound is preferred as the basic compound, and diethanolamine is particularly desirable. Examples of monomers obtained by adding a basic compound to the monomer d include a diethanolamine adduct of glycidyl (meth)acrylate and a benzylethanolamine adduct of glycidyl (meth)acrylate.

By using the monomer f, basic groups can be introduced into the oil-soluble resin A, but basic groups can also be introduced into the oil-soluble resin A by, for example, adding a basic compound described above to a unit derived from the monomer c or the monomer d.

As the monomer g, for example, an alkyl (meth)acrylate having an alkyl group of 19 or more carbon atoms or the like can be used favorably. Examples of preferred alkyl (meth)acrylates having an alkyl group of 19 or more carbon atoms include behenyl (meth)acrylate. A single monomer g may be used alone, or a combination of two or more monomers g may be used.

The monomers described above can be polymerized easily by a conventional radical polymerization. With respect to the reaction system, the reaction is preferably performed as a solution polymerization or a dispersion polymerization. During the polymerization reaction, a conventional thermal polymerization initiator such as an azo compound such as azobisisobutyronitrile or a peroxide such as t-butyl peroxybenzoate or t-butyl peroxy-2-ethylhexanoate may be used as a polymerization initiator. A photopolymerization initiator that generates radicals upon irradiation with active energy rays may also be used. In a solution polymerization, as the polymerization solvent, for example, a petroleum-based hydrocarbon solvent, a polar solvent or the like may be used. As the polymerization solvent one or more solvents selected from among solvents that can be retained and used as the non-aqueous solvent of the ink (described below) may be preferably used.

During the polymerization reaction, a typically used polymerization inhibitor, a polymerization accelerator, a dispersant and/or the like may also be added to the reaction system. From the viewpoint of obtaining the molecular weight of the resin obtained following the polymerization that falls within the preferred range described below, a chain transfer agent during the polymerization may be used. Examples of chain transfer agents that may be used include thiols such as n-butyl mercaptan, lauryl mercaptan, stearyl mercaptan and cyclohexyl mercaptan.

One example of specific reaction conditions and a reaction flow for synthesis of the oil-soluble resin A is outlined below.

(1) A non-aqueous solvent is heated to a temperature of 50 to 150° C. in a synthesis container.

(2) A mixed liquid containing the monomer a, one or more other monomers if required (for example, at least one monomer selected from the group consisting of the monomers b to g), a polymerization initiator if required, and a non-aqueous solvent if required, is added to the non-aqueous solvent over a period of 1 to 5 hours, and is then stirred for a further 1 to 5 hours.

(3) If necessary, the non-aqueous solvent is diluted.

The oil-soluble resin A can be obtained using a synthesis method that includes this type of flow, but the synthesis method for the oil-soluble resin A is not limited to this type of method.

The one or more other monomers that may be added if required to the mixed liquid of step (2) may include, for example, at least one monomer selected from the group consisting of the monomers b to e. In those cases in which the oil-soluble resin A contains a basic group, the mixed liquid of step (2) may also contain the monomer f.

In those cases in which the oil-soluble resin A has a side chain containing a urethane linkage, then as described above, for example, the oil-soluble resin A may have a side chain containing a urethane linkage in addition to the side chain containing a polydimethylsiloxane structure, and/or, a side chain containing the polydimethylsiloxane structure may include a urethane linkage.

The urethane linkage in the side chain can be introduced, for example, by reacting a functional group capable of reacting with an amino group contained in an acrylic-based polymer that includes the functional group capable of reacting with an amino group (hereafter sometimes referred to as the "acrylic-based polymer P") with an amino alcohol and a polyvalent isocyanate compound. It is thought that if the functional group capable of reacting with an amino group is not used in the reaction with the amino alcohol and the like, then as described above, the functional group capable of reacting with an amino group may function as a pigment adsorption group.

In those cases in which the side chain containing a polydimethylsiloxane structure also includes a urethane linkage, the polydimethylsiloxane structure may be, for example, bonded to a linking group containing the urethane linkage that has been introduced using the functional group capable of reacting with an amino group.

The acrylic-based polymer P may be, for example, an acrylic-based polymer obtained by polymerizing the above monomer d, or may be an acrylic-based polymer that is a copolymer of a monomer mixture containing the monomer d and one or more other monomers. Examples of the other monomers include the monomer a, the monomer b, the monomer c, the monomer e, the monomer f and the monomer g, which are as described above, and the one or more other monomers may include at least one monomer selected from this group of monomers (for example, at least one monomer selected from the group consisting of the monomer a, the monomer b, the monomer c and the monomer e, or at least one monomer selected from the group consisting of the monomer a, the monomer b, the monomer c, the monomer e, the monomer f and the monomer g).

These components can be polymerized easily by a conventional radical polymerization. Details regarding the reaction system, polymerization initiator, polymerization solvent, and polymerization inhibitors, polymerization accelerators, dispersants and chain transfer agents that may be added to the reaction system are the same as described above.

In those cases in which the oil-soluble resin A has a side chain containing a urethane linkage (including those cases in which the side chain containing a polydimethylsiloxane structure also includes a urethane linkage), the urethane linkage in the side chain can be introduced, for example, by reacting the functional group capable of reacting with an amino group, of the acrylic-based polymer P, with an amino alcohol and a polyvalent isocyanate compound described below, and if necessary, with a polyhydric alcohol. Further, if a polyhydric alcohol containing a polydimethylsiloxane structure is used, then the polydimethylsiloxane structure can be bonded to the side chain via a linking group containing the urethane linkage.

When an amino alcohol is reacted with and bonded to a functional group capable of reacting with an amino group, and an isocyanate ester group ($R^1N=C=O$) of a polyvalent isocyanate compound is then bonded via an addition reaction to the hydroxyl group of the amino alcohol, a carbamate ester structure $R^1NHCOOR$ is formed, and a urethane linkage is introduced. Here, R indicates the amino alcohol portion bonded to the functional group capable of reacting with an amino group. A polyhydric alcohol can increase the number of urethane linkages per molecule by reaction with the polyvalent isocyanate compound. A polyhydric alcohol compound containing a polydimethylsiloxane structure can be used to graft the polydimethylsiloxane structure to a side chain via a urethane linkage.

Examples of the amino alcohol include monoethanolamine, diethanolamine and diisopropanolamine. One of the amino alcohols may be used singly, or a combination of a plurality of the amino alcohols may be used.

The amino alcohol may be reacted with the functional group capable of reacting with an amino group in an amount that is preferably within a range from 0.05 to 1 molar equivalent, and more preferably from 0.1 to 1 molar equivalent. In a case in which the amount of the amino alcohol is less than 1 molar equivalent, a portion of the functional group capable of reacting with an amino group will remain unreacted, but as described above, it is thought that this residual functional group capable of reacting with an amino group may act as a pigment adsorption group.

Examples of the polyvalent isocyanate compound include aliphatic polyvalent isocyanate compounds, alicyclic polyvalent isocyanate compounds and aromatic polyvalent isocyanate compounds. Specific examples thereof include 1,6-diisocyanatohexane, 1,3-bis(isocyanatomethyl)benzene, 1,3-bis(isocyanatomethyl)cyclohexane, and 1,5-naphthalene diisocyanate. One of the polyvalent isocyanate compounds may be used singly, or a plurality of the polyvalent isocyanate compounds may be used in combination. From the viewpoint of ensuring that no unreacted raw material remains when introducing a urethane linkage by the reaction with a hydroxyl group, the polyvalent isocyanate compound is preferably reacted in a substantially equivalent amount (0.98 to 1.02 molar equivalents) relative to the hydroxyl groups contained within the added raw material.

As the polyhydric alcohol, for example a compound such as 1,3-propanediol may be used. The polyhydric alcohol is preferably reacted in a substantially equivalent amount (0.98 to 1.02 molar equivalents) relative to the added isocyanate groups.

Examples of polyhydric alcohol compounds containing a polydimethylsiloxane structure include carbitol-modified silicone oils, examples of a commercially available product thereof including KF-6000 manufactured by Shin-Etsu Chemical Co., Ltd. The polyhydric alcohol compound containing a polydimethylsiloxane structure is preferably reacted in a substantially equivalent amount (0.98 to 1.02 molar equivalents) relative to the added isocyanate groups.

In those cases in which the oil-soluble resin A has a side chain that contains a urethane linkage, one example of specific reaction conditions and a reaction flow for synthesis of the oil-soluble resin A is outlined below.

(1') A non-aqueous solvent is heated to a temperature of 50 to 150° C. in a synthesis container.

(2') A mixed liquid containing the monomer d, one or more other monomers if required (for example, at least one monomer selected from the group consisting of the monomer a, the monomer b, the monomer c, the monomer e, the monomer f and the monomer g), a polymerization initiator if required, and a non-aqueous solvent if required is added to the non-aqueous solvent over a period of 1 to 5 hours, and stirring is then continued for a further 1 to 3 hours to obtain an acrylic-based polymer P.

(3') The acrylic-based polymer P is heated to a temperature of 50 to 150° C. inside the synthesis container, and an amino alcohol is then added and stirred for 1 to 2 hours.

(4') A polyvalent isocyanate, if required a polyhydric alcohol and/or a polyhydric alcohol compound containing a polydimethylsiloxane structure, and if required a urethanization catalyst are added over a period of 1 hour, and the mixture is then stirred for 1 to 5 hours.

(5') If necessary, the non-aqueous solvent is diluted.

The oil-soluble resin A having a side chain containing a urethane linkage can be obtained using a synthesis method that includes this type of flow, but the synthesis method for the oil-soluble resin A in those cases in which the oil-soluble resin A has a side chain containing a urethane linkage is not limited to this type of method. In those cases in which the monomer a is used as one of the one or more other monomers in step (2'), an oil-soluble resin A having a side chain containing a polydimethylsiloxane structure as well as a side chain containing a urethane linkage can be obtained. In those cases in which a polyhydric alcohol compound containing a polydimethylsiloxane structure is used in step (4'), an oil-soluble resin A having a side chain in which a polydimethylsiloxane structure is bonded to the side chain via a linking group containing a urethane linkage can be obtained.

For the urethanization catalyst, a bismuth carboxylate salt can be used.

The one or more other monomers that may be added if required to the mixed liquid in step (2') may include, for example, at least one monomer selected from the group consisting of the monomer a, the monomer b, the monomer c and the monomer e. In those cases in which the oil-soluble resin A contains a basic group, the mixed liquid of step (2') may contain the monomer f.

In those cases in which the oil-soluble resin A contains a basic group, the resin can be produced, for example, by a method in which the monomer f is included in the monomer mixture within one of the methods described above. For example, the oil-soluble resin A may be produced by a method in which the monomer f is included in the monomer mixture in one of the reaction flows described above.

In those cases in which the oil-soluble resin A contains a basic group, the basic group may be introduced by a reaction between a functional group capable of reacting with an amino group and the basic compound described above. In such cases, the oil-soluble resin A may be obtained, for example, by a method including reacting the basic compound described above and the functional group capable of reacting with an amino group in the acrylic-based polymer P described above. Further, the oil-soluble resin A may also be obtained, for example, by a method including reacting the basic compound described above and the functional group capable of reacting with an amino group contained in a copolymer of a monomer mixture containing the monomer a, the monomer b, and at least one monomer selected from the group consisting of the monomer c and the monomer d.

From the viewpoint of achieving favorable image density for the printed items and the viewpoint of reducing strike-through for the printed items, the amount of the structural unit having a side chain containing a polydimethylsiloxane structure, relative to the total of all the structural units of the oil-soluble resin A, is preferably at least 2% by mass, more preferably at least 5% by mass, and even more preferably 10% by mass or greater. From the viewpoint of obtaining favorable image density, the viewpoint of reducing strike-through, and the viewpoint of improving the storage stability, the amount of the structural unit having a side chain containing a polydimethylsiloxane structure, relative to the total of all the structural units of the oil-soluble resin A, is preferably not more than 80% by mass, more preferably not more than 70% by mass, and even more preferably 40% by mass or less.

The amount of the structural unit having a side chain containing a polydimethylsiloxane structure relative to the total of all the structural units of the oil-soluble resin A can be determined as the ratio (% by mass) of the total mass of the raw material compounds that constitute the structural unit having a side chain containing a polydimethylsiloxane structure, relative to the total mass of all the raw material compounds that constitute the oil-soluble resin A.

From the viewpoint of achieving favorable image density for the printed items and the viewpoint of reducing strike-through for the printed items, the amount of the structural unit having a side chain containing a polydimethylsiloxane structure, relative to the total of all the structural units of the oil-soluble resin A, is preferably from 5 to 70% by mass, and more preferably from 10 to 40% by mass, and in addition, the non-aqueous solvent described below preferably contains a silicone oil.

In those cases in which the oil-soluble resin A contains a structural unit having a basic group, the amount of the structural unit having a basic group, relative to the total of all the structural units of the oil-soluble resin A, is preferably from 1 to 40% by mass, more preferably from 2 to 30% by mass, and even more preferably from 5 to 20% by mass. When the oil-soluble resin A contains a structural unit having a basic group, the amount of the structural unit having a side chain containing a polydimethylsiloxane structure relative to the total of all the structural units of the oil-soluble resin A may fall within the above range, and for example may be from 1 to 60% by mass, but is preferably from 2 to 40% by mass, and more preferably from 4 to 30% by mass.

In those cases in which the oil-soluble resin A contains a structural unit having an alkyl group of 8 to 18 carbon atoms and/or a structural unit having an alkyl group of 19 or more carbon atoms, the amount of these structural units (the total amount in the case in which the resin includes both structural units) relative to the total of all the structural units of the oil-soluble resin A is preferably from 5 to 70% by mass.

In those cases in which the oil-soluble resin A contains a structural unit having an alkyl group of 8 to 18 carbon atoms, the amount of the structural unit having an alkyl group of 8 to 18 carbon atoms relative to the total of all the structural units of the oil-soluble resin A, is preferably from 1 to 70% by mass, and more preferably from 1 to 40% by mass.

In those cases in which the oil-soluble resin A contains a structural unit having a (3-dicarbonyl group and/or a structural unit having a functional group capable of reacting with an amino group, the amount of the structural unit having a β-dicarbonyl group and the structural unit having a functional group that capable of reacting with an amino group (the total amount in the case in which the resin includes both structural units), relative to the total of all the structural units of the oil-soluble resin A, is preferably from 10 to 40% by mass.

The amount of each structural unit relative to the total of all the structural units of the oil-soluble resin A can be determined as the ratio (% by mass) of the total mass of the raw material compounds that constitute the structural unit, relative to the total mass of all the raw material compounds that constitute the oil-soluble resin A.

Although there are no particular limitations on the molecular weight (weight average molecular weight) of the oil-soluble resin A, in those cases in which the oil-soluble resin A is used in an inkjet ink, from the viewpoint of the ink discharge properties, the molecular weight is preferably from about 5,000 to about 50,000, and is more preferably from about 10,000 to about 30,000. The weight average molecular weight is the styrene-equivalent weight average molecular weight measured by the GPC method.

The glass transition temperature (Tg) of the oil-soluble resin A is preferably lower than normal temperature, and is more preferably 0° C. or lower. This means that when the ink is fixed to a recording medium, film formation can be promoted at normal temperature.

The amount of the oil-soluble resin A, expressed as a mass ratio relative to a value of 1 for the colorant, may be, for example, from 0.1 to 5, and is preferably from 0.1 to 1. For example, in those cases in which the ink contains a pigment, the amount of the oil-soluble resin A, expressed as a mass ratio relative to a value of 1 for the pigment, may be, for example, from 0.1 to 5, and is preferably from 0.1 to 1. In those cases in which the ink contains colored resin particles, the amount of the oil-soluble resin A, expressed as a mass ratio relative to a value of 1 for the colored resin particles, may be, for example, from 0.1 to 5, and is preferably from 0.1 to 1.

From the viewpoint of ensuring favorable dispersibility of the pigment or colored resin particles or the like, the amount of the oil-soluble resin A relative to the total amount of the ink is preferably at least 0.01% by mass, more preferably at least 0.1% by mass, even more preferably at least 1% by mass, and still more preferably 2% by mass or greater. On the other hand, from the viewpoints of the ink viscosity and the storage stability under high-temperature conditions, the amount of the oil-soluble resin A is preferably not more than 20% by mass, more preferably not more than 10% by mass, even more preferably not more than 8% by mass, and still more preferably 5% by mass or less. For example, the amount of the oil-soluble resin A relative to the total mass of the ink is preferably from 0.01 to 20% by mass, more preferably from 0.1 to 20% by mass, even more preferably from 1 to 10% by mass, still more preferably from 1 to 8% by mass, still more preferably from 2 to 8% by mass, and further preferably from 2 to 5% by mass.

From the viewpoints of preventing any increase in the ink viscosity and further improving the discharge performance, the amount of the resin component contained within the oil-soluble resin A is preferably not more than 10% by mass relative to the total mass of the ink. The amount of the resin component contained within the oil-soluble resin A relative to the total mass of the ink may be, for example, not more than 7% by mass, or 5% by mass or lower.

In those cases in which the ink contains a pigment, and in those cases in which the ink contains colored resin particles, the ink may also contain another dispersant. Examples of compounds that can be used favorably as this other dispersant include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Commercially available examples of the other dispersants include Antaron V216 (a vinylpyrrolidone-hexadecene copolymer) and Antaron V220 (a vinylpyrrolidone-eicosene copolymer) (both product names), manufactured by ISP Japan Ltd.; Solsperse 13940 (a polyester amine-based dispersant), Solsperse 16000, Solsperse 17000 and Solsperse 18000 (fatty acid amine-based dispersants), and Solsperse 11200, Solsperse 24000 and Solsperse 28000 (all product names), manufactured by The Lubrizol Corporation; EFKA 400, EFKA 401, EFKA 402, EFKA 403, EFKA 450, EFKA 451 and EFKA 453 (modified polyacrylates) and EFKA 46, EFKA 47, EFKA 48, EFKA 49, EFKA 4010 and EFKA 4055 (modified polyurethanes) (all product names), manufactured by BASF Japan Ltd.; DISPARLON KS-860 and DISPARLON KS-873N4 (polyester amine salts) (both product names), manufactured by Kusumoto Chemicals, Ltd.; DISCOL 202, DISCOL 206, DISCOL OA-202 and DISCOL OA-600 (multi-chain polymeric nonionic dispersants) (all product names), manufactured by DKS Co., Ltd.; DISPERBYK 2155 and DISPERBYK 9077 (both product names). manufactured by BYK-Chemie Japan K.K.; and Hypermer KD2, Hypermer KD3, Hypermer Hypermer KD11 and Hypermer KD12 (all product names), manufactured by Croda Japan K.K.

When the other dispersant described above is included in the ink, in those cases in which the ink contains a pigment, the total amount of the oil-soluble resin A and the other dispersant, expressed as a mass ratio relative to a value of 1 for the pigment, may be from 0.1 to 5, preferably from 0.1 to 2, and more preferably from 0.1 to 1. In those cases in which the ink contains colored resin particles, the total amount of the oil-soluble resin A and the other dispersant, expressed as a mass ratio relative to a value of 1 for the colored resin particles, may be, for example, from 0.1 to 5, preferably from 0.1 to 2, and more preferably from 0.1 to 1. The total amount of the oil-soluble resin A and the other dispersant described above relative to the total mass of the ink is preferably from 0.01 to 20% by mass, more preferably from 0.01 to 10% by mass, and for example, may be from 1 to 5% by mass.

As the non-aqueous solvent, for example, any one or more of selected from the group consisting of non-polar organic solvents and polar organic solvents may be used. A silicone oil may be used as the non-aqueous solvent. In the present embodiment, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents, examples of which include aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based non-aqueous solvents, isoparaffin-based non-aqueous solvents, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., even more preferably at least 200° C., still more preferably at least 300° C., and still more preferably 350° C. or higher. The initial boiling point can be measured in accordance with JIS K0066 "Test Methods for Distillation of Chemical Products".

Examples of preferred polar organic solvents include fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, isotridecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having at least 6 carbon atoms, and preferably 12 to 20 carbon atoms, within one molecule, such as isomyristyl alcohol, isopalmityl alcohol, hexyldecanol, stearyl alcohol (1-octyldecanol), isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., even more preferably at least 250° C., still more preferably at least 300° C., and still more preferably 350° C. or higher. These non-aqueous solvents having a boiling point of 250° C. or higher, non-aqueous solvents having a boiling point of 300° C. or higher, and non-aqueous solvents having a boiling point of 350° C. or higher also include non-aqueous solvents that do not exhibit an actual boiling point.

From the viewpoint of suppressing clear file deformation, these petroleum-based hydrocarbon solvents and polar solvents preferably have a high initial boiling point or a high boiling point. On the other hand, non-aqueous solvents having a high initial boiling point or a high boiling point and low volatility tend to increase the ink viscosity. By using the ink of the present embodiment, favorable discharge properties can be obtained easily even when a petroleum-based hydrocarbon solvent having a high initial boiling point and/or a polar solvent having a high boiling point is used.

A silicone oil is a compound that has silicon atoms and carbon atoms in one molecule, and is liquid at 23° C.

Compounds having silyl groups, compounds having silyloxy groups, and compounds having siloxane linkages and the like can be used as the silicone oil, and polysiloxane compounds can be used particularly favorably.

Chain-like silicone oils, cyclic silicone oils, and modified silicone oils and the like can be used as the silicone oil.

The chain-like silicone oil is preferably a chain-like polysiloxane having 2 to 30 silicon atoms, more preferably 2 to 20 silicon atoms, and even more preferably 3 to 10 silicon atoms. Examples of the chain-like silicone oils include linear dimethyl silicone oils such as tetradecamethylhexasiloxane and hexadecamethylheptasiloxane, and branched dimethyl silicone oils such as methyltris(trimethylsiloxy)silane and tetrakis(trimethylsiloxy)silane.

The cyclic silicone oil is preferably a cyclic polysiloxane having 5 to 9 silicon atoms, and cyclic dimethyl silicone oils such as decamethylcyclopentasiloxane, dodecamethylcyclohexasiloxane, hexadecamethylcyclooctasiloxane and octadecamethylcyclononasiloxane can be used favorably.

Examples of the modified silicone oils include silicone oils having any of various organic groups introduced at a portion of the silicon atoms of a chain-like or cyclic dimethyl silicone oil. Modified silicone oils in which all of the silicon atoms are bonded solely to carbon atoms or the oxygen atoms of siloxane linkages are preferred. The modified silicone oil is preferably a non-reactive silicone oil. Further, modified silicone oils in which the constituent atoms include only silicon atoms, carbon atoms, oxygen atoms and hydrogen atoms are preferred.

Examples of compounds that may be used as the modified silicone oil include compounds in which at least one methyl group contained in a chain-like or cyclic dimethyl silicone oil has been substituted with at least one group selected from the group consisting of alkyl groups, carboxylate ester linkage-containing groups, aromatic ring-containing groups and ether linkage-containing groups.

Examples of compounds that may be used as the modified silicone oil further include compounds in which at least one silicon atom contained in a chain-like or cyclic dimethyl silicone oil is bonded to a silicon atom of another chain-like or cyclic dimethyl silicone oil via an alkylene group. In these cases, at least one methyl group contained in the chain-like or cyclic dimethyl silicone oils that are linked via the alkylene group may be substituted with at least one group selected from the group consisting of alkyl groups, carboxylate ester linkage-containing groups, aromatic ring-containing groups and ether linkage-containing groups.

Specific examples of the modified silicone oil include alkyl-modified silicone oils, aryl-modified silicone oils such as phenyl-modified silicone oils and aralkyl-modified silicone oils, carboxylate ester-modified silicone oils, alkylene-modified silicone oils, and polyether-modified silicone oils.

In the modified silicone oil, the number of silicon atoms is preferably from 2 to 20, more preferably from 2 to 10, even more preferably from 2 to 6, and still more preferably from 3 to 6.

Examples of the alkyl-modified silicone oils include silicone oils having one, or two or more, alkyl groups of 2 to 20 carbon atoms, such as an ethyl group, a propyl group, an n-butyl group, an isobutyl group, a tert-butyl group, a pentyl group, a hexyl group, a heptyl group, an octyl group, an isooctyl group, a nonyl group, a decyl group, a dodecyl group, a hexadecyl group or an eicosyl group in one molecule.

The number of carbon atoms in the alkyl group of the alkyl-modified silicone oil is preferably at least 4, more preferably at least 6, and even more preferably 8 or greater. Further, the number of carbon atoms in the alkyl group of the alkyl-modified silicone oil is preferably not more than 20, more preferably not more than 16, and even more preferably 12 or fewer.

Examples of the alkyl-modified silicone oil include compounds in which at least one methyl group contained in a chain-like or cyclic dimethyl silicone oil has been substituted with an alkyl group having at least 2 (and preferably 2 to 20) carbon atoms, and a modified silicone oil S described below that has an alkyl group of at least 4 carbon atoms as an organic group in which the total number of carbon atoms and oxygen atoms is at least 4.

Examples of the aryl-modified silicone oils include silicone oils having one, or two or more, functional groups such as a phenyl group, a tolyl group, a xylyl group, a trimethylphenyl group, a biphenylyl group, a naphthyl group, an anthracenyl group, and a group in which at least one hydrogen atom of one of these groups has been substituted with an alkyl group, in one molecule.

Among these, examples of phenyl-modified silicone oils include methyl phenyl silicones such as diphenyl dimethicone, trimethylsiloxyphenyl dimethicone, phenyl trimethicone, diphenylsiloxyphenyl trimethicone, trimethylpentaphenyltrisiloxane, and 1,1,1,5,5,5-hexamethyl-3-phenyl-3-(trimethylsilyloxy)trisiloxane.

Examples of the carboxylate ester-modified silicone oils include silicone oils having one, or two or more, alkylcarbonyloxy groups having an alkyl group of 1 to 20 carbon atoms or alkoxycarbonyl groups having an alkoxy group of 1 to 20 carbon atoms in one molecule.

Commercially available products may be used as the silicone oil, and examples of products that may be used include "KF-96L-2CS", "KF-96L-5CS" and "KF-56A" manufactured by Shin-Etsu Chemical Co., Ltd., "DC246 Fluid" and "FZ-3196" manufactured by Dow Corning Toray Co., Ltd., and "1,1,1,5,5,5-hexamethyl-3-phenyl-3-(trimethylsilyloxy)trisiloxane", "decamethylcyclopentasiloxane" and "dodecamethylcyclohexasiloxane" manufactured by Tokyo Chemical Industry Co., Ltd.

Examples of the modified silicone oil include silicone oils having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule. In the following description, this type of silicone oil is also referred to as the modified silicone oil S.

The modified silicone oil S may contain one or more groups selected from the group consisting of groups (A) to (D) described below as the organic group in which the total number of carbon atoms and oxygen atoms is at least 4.

(A) Alkyl groups having at least 4 carbon atoms.
(B) Carboxylate ester linkage-containing groups in which the total number of carbon atoms and oxygen atoms is at least 4.
(C) Aromatic ring-containing groups having at least 6 carbon atoms.
(D) Alkylene groups having at least 4 carbon atoms.

In the modified silicone oil S, the total number of carbon atoms and oxygen atoms contained in all of the organic groups in which the total number of carbon atoms and oxygen atoms is at least 4 is preferably 4 or greater, more preferably 8 or greater, and even more preferably 10 or greater, in one molecule. This may enable ink wetting of the nozzle plate surface to be reduced.

In the modified silicone oil S, the total number of carbon atoms and oxygen atoms contained in all of the organic groups in which the total number of carbon atoms and oxygen atoms is at least 4 is preferably not more than 20, more preferably not more than 16, and even more preferably 12 or fewer, in one molecule. This may enable the ink to have a lower viscosity, and can improve the discharge performance.

In those cases in which one molecule of the modified silicone oil S contains two or more of the organic groups in which the total number of carbon atoms and oxygen atoms is at least 4, the total number of carbon atoms and oxygen atoms, in one molecule, that are contained within all of the organic groups in which the total number of carbon atoms and oxygen atoms is at least 4 refers to the total number of carbon atoms and oxygen atoms contained in the two or more organic groups which each have a total number of carbon atoms and oxygen atoms of at least 4.

From the viewpoint of preventing adhesion of the ink to the nozzle plate, the modified silicone oil S is preferably a compound in which the total number of carbon atoms and oxygen atoms, contained within all of the organic groups in which the total number of carbon atoms and oxygen atoms is at least 4, is from 4 to 12 within one molecule.

From the viewpoints of lowering the viscosity of the ink and improving the discharge performance, the modified silicone oil S is preferably a compound in which the total number of carbon atoms and oxygen atoms, contained within all of the organic groups in which the total number of carbon atoms and oxygen atoms is at least 4, is from 8 to 20 within one molecule.

Examples of the modified silicone oil S include silicone oils that are compounds represented by general formula (X) shown below.

General formula (X)

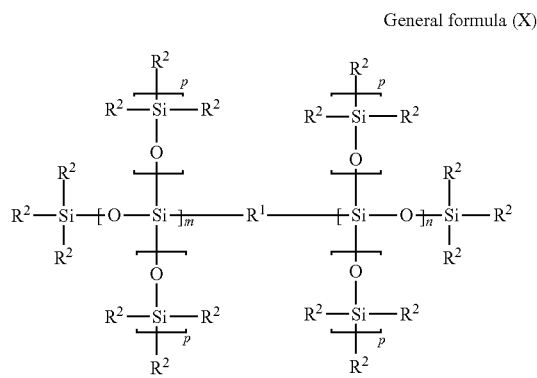

In general formula (X), $R^1$ represents an oxygen atom or a divalent organic group having a carbon atom bonded directly to a silicon atom, each $R^2$ independently represents a monovalent organic group having a carbon atom bonded directly to a silicon atom, each of m and n independently represents an integer of 0 to 4, each p independently represents an integer of 0 to 2, the number of silicon atoms within one molecule is from 2 to 6, at least one of $R^1$ and $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X), it is preferable that $R^1$ is an oxygen atom, or a divalent organic group in which the total number of carbon atoms and oxygen atoms is at least 4, and each $R^2$ independently represents a methyl group, or a monovalent organic group in which the total number of carbon atoms and oxygen atoms is at least 4.

It is preferable that in general formula (X), $R^1$ is an oxygen atom or an alkylene group having at least 4 carbon atoms, and each $R^2$ independently represents a methyl group, an alkyl group having at least 4 carbon atoms, a carboxylate ester linkage-containing group in which the total number of carbon atoms and oxygen atoms is at least 4, or an aromatic ring-containing group having at least 6 carbon atoms, wherein at least one of $R^1$ and $R^2$ is a group selected from the group consisting of alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, and the total number of carbon atoms and oxygen atoms in one molecule that are contained within all of the alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, is from 4 to 20.

Examples of the modified silicone oil S include silicone oils that are compounds represented by general formula (X-1) shown below.

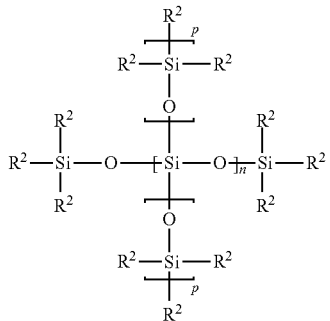

General formula (X-1)

In general formula (X-1), each $R^2$ independently represents a monovalent organic group having a carbon atom bonded directly to a silicon atom, n represents an integer of 0 to 4, each p independently represents 0 or 1, the number of silicon atoms within one molecule is from 2 to 6, at least one $R^2$ is an organic group in which the total number of carbon atoms and oxygen atoms is at least 4, and the total number of carbon atoms and oxygen atoms contained within all of the organic groups in which the total number of carbon atoms and oxygen atoms is at least 4 is from 4 to 20 within one molecule.

In general formula (X-1), it is preferable that each $R^2$ independently represents a methyl group or a monovalent organic group in which the total number of carbon atoms and oxygen atoms is at least 4.

In general formula (X-1), at least one $R^2$ is preferably selected from the group consisting of alkyl groups having at least 4 carbon atoms, carboxylate ester linkage-containing group in which the total number of carbon atoms and oxygen atoms is at least 4, and aromatic ring-containing groups having at least 6 carbon atoms.

In the modified silicone oil S, the alkyl group having at least 4 carbon atoms may be either a chain-like group or an alicyclic group, and may be either a linear or branched alkyl group.

The number of carbon atoms in this alkyl group is preferably at least 4, and is more preferably at least 6, even more preferably at least 8, and still more preferably 10 or greater.

The number of carbon atoms in this alkyl group is preferably not more than 20, more preferably not more than 16, and even more preferably 12 or fewer.

Examples of the alkyl group having at least 4 carbon atoms include an n-butyl group, an isobutyl group, a tert-butyl group, a pentyl group, a hexyl group, a heptyl group, an octyl group, an isooctyl group, a nonyl group, a decyl group, a dodecyl group, a hexadecyl group and an eicosyl group.

Preferred alkyl groups include an octyl group, a decyl group, a dodecyl group and a hexadecyl group, and a decyl group or a dodecyl group is particularly preferred.

Examples of compounds that can be used favorably as the modified silicone oil S having an alkyl group include compounds of the above general formula (X-1) in which each $R^2$ independently a methyl group or an alkyl group in which a carbon atom is bonded directly to the silicon atom and in which the total number of carbon atoms and oxygen atoms is at least 4, n is an integer of 0 to 4, each p independently represents 0 or 1, the number of silicon atoms within one molecule is from 2 to 6, at least one $R^2$ is an aforementioned alkyl group, and the total number of carbon atoms and oxygen atoms contained within all of the above alkyl groups is from 4 to 20 within one molecule.

For example, compounds represented by general formula (1) shown below can be used as the modified silicone oil S having an alkyl group.

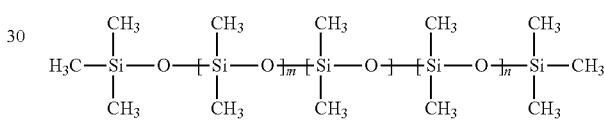

(I)

In general formula (1), R is a linear or branched alkyl group of 4 to 20 carbon atoms, and each of m and n independently represents an integer of 0 to 2, provided that m+n≤2.

In general formula (1), R represents a linear or branched alkyl group of 4 to 20 carbon atoms. In those cases in which the number of carbon atoms in the alkyl group represented by R is at least 4, preferably at least 6, more preferably at least 8, and even more preferably 10 or greater, the wetting characteristics of the ink on the nozzle plate may be improved. In particular, a number of carbon atoms of 10 or greater may increase the surface tension, thereby improving the wetting characteristics.

In those cases in which the number of carbon atoms in the alkyl group represented by R is not more than 20, preferably not more than 16, and even more preferably 12 or fewer, clear file deformation may be prevented, any increase in the ink viscosity may be suppressed, and the discharge performance can be improved.

In general formula (1), it is preferable that m and n are both 0.

In the modified silicone oil S, a group represented by —$R^{Bb}$—O—(CO)—$R^{Ba}$ or a group represented by —$R^{Bb}$—(CO)—O—$R^{Ba}$, in which the carboxylate ester linkage is bonded to a silicon atom of the main-chain siloxane linkage via an alkylene group, can be used favorably as the carboxylate ester linkage-containing group.

Here, $R^{Ba}$ is preferably a chain-like or alicyclic alkyl group of at least 1 carbon atom, which may be either linear or branched. Further $R^{Bb}$ is preferably a chain-like or alicyclic group of at least 1 carbon atom, which may be either linear or branched. It is more preferable that the alkylene group linking the silicon atom of the main-chain siloxane linkage and the carboxylate ester linkage has at least 2 carbon atoms.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$), and the number of carbon atoms in the alkylene group ($R^{Bb}$).

In the carboxylate ester linkage-containing group, examples of the alkyl group ($R^{Ba}$) include a methyl group, an ethyl group, a propyl group, an isopropyl group, an n-butyl group, an isobutyl group, a tert-butyl group, a pentyl group, a hexyl group, a heptyl group, an octyl group, an isooctyl group, a nonyl group, a decyl group, a dodecyl group, a hexadecyl group and a heptadecyl group.

Preferred examples of the alkyl group include a pentyl group, a heptyl group, a nonyl group and a tridecyl group, and a heptyl group or nonyl group is particularly preferred.

In the carboxylate ester linkage-containing group, the alkylene group ($R^{Bb}$) is preferably a linear alkylene group of 1 to 8 carbon atoms, and examples include a methylene group, an ethylene group, a propylene group, a trimethylene group, an n-butylene group, an isobutylene group, a pentylene group, a hexylene group, a heptylene group, an octylene group and an isooctylene group. An ethylene group is preferred.

Examples of compounds that can be used favorably as the modified silicone oil S having a carboxylate ester linkage-containing group include compounds of the above general formula (X-1) in which each $R^2$ independently represents a methyl group or a carboxylate ester linkage-containing group in which a carbon atom is bonded directly to a silicon atom and in which the total number of carbon atoms and oxygen atoms is at least 4, n represents an integer of 0 to 4, each p independently represents 0 or 1, the number of silicon atoms within one molecule is from 2 to 6, at least one $R^2$ is an aforementioned carboxylate ester linkage-containing group, and the total number of carbon atoms and oxygen atoms contained within all of the carboxylate ester linkage-containing groups within one molecule is from 4 to 20.

In the modified silicone oil S, examples of groups that can be used favorably as the aromatic ring-containing group include groups represented by —$R^{Ca}$ in which the aromatic ring is bonded directly to a silicon atom of the main-chain siloxane linkage, and groups represented by —$R^{Cb}$—$R^{Ca}$, in which the aromatic ring is bonded to a silicon atom of the main-chain siloxane linkage via an alkylene group.

Here, $R^{Ca}$ is preferably an aromatic ring having at least 6 carbon atoms. $R^{Cb}$ is preferably a chain-like or alicyclic alkylene group of at least 1 carbon atom, which may be either linear or branched.

In those cases where the aromatic ring-containing group is a group represented by —$R^{Ca}$ in which the aromatic ring is bonded directly to a silicon atom of the main-chain siloxane linkage, it is preferable that a trimethylsilyloxy group or the like branches from the main-chain siloxane linkage as a side chain. It is even more preferable that the aromatic ring-containing group is a group represented by —$R^{Cb}$—$R^{Ca}$— in which the aromatic ring is bonded to a silicon atom of the main-chain siloxane linkage via an alkylene group.

In the aromatic ring-containing group, examples of the aromatic ring portion ($R^{Ca}$) include a phenyl group, a tolyl group, a xylyl group, a trimethylphenyl group, a biphenylyl group, a naphthyl group, an anthracenyl group, and a functional group in which at least one hydrogen atom of one of these groups has been substituted with an alkyl group.

The aromatic ring-containing group may contain one, or two or more aromatic rings, but the total number of carbon atoms in all of the aromatic ring-containing groups of at least 6 carbon atoms in one molecule is preferably from 6 to 20.

In the aromatic ring-containing group, the optional alkylene group ($R^{Cb}$) is preferably a linear or branched alkylene group of 1 to 8 carbon atoms, and examples include a methylene group, an ethylene group, a propylene group, a trimethylene group, an n-butylene group, an isobutylene group, a pentylene group, a hexylene group, a heptylene group, an octylene group and an isooctylene group.

A propylene group, a methylethylene group or an ethylene group is preferred.

Examples of compounds that can be used favorably as the modified silicone S having an aromatic ring-containing group include compounds of the above general formula (X-1) in which each $R^2$ independently represents a methyl group or an aromatic ring-containing group of at least 6 carbon atoms in which a carbon atom is bonded directly to a silicon atom, n represents an integer of 0 to 4, each p independently represents 0 or 1, the number of silicon atoms within one molecule is from 2 to 6, at least one $R^2$ is an aforementioned aromatic ring-containing group, and the total number of carbon atoms contained within all of the aromatic ring-containing groups within one molecule is from 6 to 20.

One embodiment of the modified silicone oil S is a compound having 2 to 6 silicon atoms and an alkylene group of at least 4 carbon atoms, and is preferably a compound having a siloxane linkage bonded to the carbon atom at one terminal of an alkylene group of at least 4 carbon atoms, and having a silyl group or a siloxane linkage bonded to the carbon atom at the other terminal of the alkylene group.

The alkylene group of at least 4 carbon atoms may be a chain-like group or an alicyclic group, and may be a linear or branched alkylene group.

Examples of the alkylene group of at least 4 carbon atoms include an n-butylene group, an isobutylene group, a pentylene group, a hexylene group, a heptylene group, an octylene group, an isooctylene group, a nonylene group, a decylene group, a dodecylene group, a hexadecylene group and an eicosylene group.

An octylene group, a decylene group or a dodecylene group is preferred, and an octylene group or a decylene group is more preferred.

Examples of compounds that can be used favorably as the modified silicone S having an alkylene group include compounds of the above general formula (X) in which $R^1$ represents an alkylene group of at least 4 carbon atoms, $R^2$ represents a methyl group, each of m and n independently represents an integer of 0 to 4, each p independently represents an integer of 0 to 2, and the number of silicon atoms within one molecule is from 2 to 6.

The modified silicone oil S described above can be produced using the method described below, but the invention is not restricted to this particular method.

For example, an alkyl-modified silicone oil can be obtained by reacting a siloxane raw material with a reactive compound having both an organic group in which the total number of carbon atoms and oxygen atoms is at least 4 and a reactive group, in an organic solvent. The siloxane raw material and the reactive compound are preferably reacted so that the molar ratio between the reactive group of the siloxane raw material and the reactive group of the reactive compound is within a range from 1:1 to 1:1.5. During the reaction, a catalyst such as a platinum catalyst examples of which include a zero-valent platinum olefin complex, a zero-valent platinum vinylsiloxane complex, a divalent platinum olefin complex halide and platinic chloride, can be used favorably.

Examples of compounds that can be used as the siloxane raw material include 1,1,1,3,5,5,5-heptamethyltrisiloxane, 1,1,1,3,3,5,7,7,7-nonamethyltetrasiloxane, 1,1,1,3,3,5,7,7,9, 9,9-undecamethylpentasiloxane, pentamethyldisiloxane, 1,1,3,3,5,5,5-heptamethyltrisiloxane, 1,1,3,3-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, and 1,1,3,3,5,5,7,7,9,9,11,11-dodecamethylhexasiloxane.

The reactive compound preferably has a carbon double bond as the reactive group.

Examples of reactive compounds that can be used for introducing an alkyl group into the modified silicone oil S include alkenes having at least 4 carbon atoms, such as 1-butene, 2-butene, 1-pentene, 1-hexene, 1-heptene, 1-octene, 2-octene, 1-nonene, 1-decene, 1-dodecene, 1-hexadecene and 1-eicosene.

Further, besides alkenes, alicyclic hydrocarbons having an ethylenic unsaturated double bond such as vinylcyclohexane can also be used.

Examples of reactive compounds that can be used for introducing an ester linkage-containing group into the modified silicone oil S include vinyl esters of fatty acids and allyl esters of fatty acids in which the total number of carbon atoms and oxygen atoms is at least 6, such as vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate, vinyl eicosanoate and allyl hexanoate.

Examples of reactive compounds that can be used for introducing an aromatic ring-containing group into the modified silicone oil S include aryl compounds having a vinyl bond and an aromatic ring of at least 6 carbon atoms, such as 4-methylstyrene, 2-methyl styrene, 4-tert-butyl styrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenyl ethylene, triphenylethylene, 2,4,6-trimethylstyrene, cis-β-methyl styrene, trans-β-methyl styrene, and 3-phenyl-1-propene.

Examples of reactive compounds that can be used for introducing an alkylene group into the modified silicone oil S include diene compounds having at least 4 carbon atoms, such as 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

One of these non-aqueous solvents may be used alone, or a combination of two or more these non-aqueous solvents may be used, provided the solvents form a single phase.

From the viewpoint of suppressing clear file deformation, the non-aqueous solvent preferably contains a silicone oil.

From the viewpoint of improving the discharge performance, the silicone oil preferably contains an alkyl-modified silicone oil. Alkyl-modified silicone oils tend to improve the ink surface tension, making it easier to improve the discharge properties.

From the viewpoint of suppressing clear file deformation, the amount of the silicone oil relative to the total mass of the non-aqueous solvent is preferably at least 10% by mass, and even more preferably 15% by mass or greater. The silicone oil may represent 100% by mass of the total mass of the non-aqueous solvent, but is preferably not more than 90% by mass, and more preferably 80% by mass or less, relative to the total mass of the non-aqueous solvent.

From the viewpoints of improving the image density and reducing strike-through, the ink preferably includes an oil-insoluble resin. The oil-insoluble resin has low compatibility with the non-aqueous solvent of the ink, and is preferably dispersed as liquid droplets within the non-aqueous solvent of the ink.

The oil-insoluble resin is preferably an oil-insoluble resin having an amino group. The oil-insoluble resin having an amino group may have a primary amino group, secondary amino group, tertiary amino group, or combination thereof as the amino group, but preferably has a primary amino group and/or a secondary amino group.

The number average molecular weight of the oil-insoluble resin having an amino group is preferably at least 500, and more preferably 600 or greater. The number average molecular weight of the oil-insoluble resin having an amino group is preferably not more than 15,000.

Examples of the oil-insoluble resin having an amino group include basic polymer electrolytes such as polyethyleneimine, polyvinylamine and polyvinylpyridine, as well as derivatives of these electrolytes, and a polyethyleneimine having a number average molecular weight of 200 to 20,000 can be used particularly favorably. Provided the number average molecular weight of the polyethyleneimine is at least 200, an increase in the density on plain paper may be more easily obtained, whereas provided the number average molecular weight ids not more than 20,000, favorable storage stability may be more easily obtained. The number average molecular weight of the polyethyleneimine is more preferably from 300 to 2,000.

A commercially available product may be used as the polyethyleneimine, and examples of favorable products include SP-006, SP-012, SP-018 and SP-200 manufactured by Nippon Shokubai Co., Ltd., and Lupasol FG, Lupasol G20 Waterfree and Lupasol PR8515 manufactured by BASF Corporation.

The amount of the oil-insoluble resin, expressed as a mass ratio relative to the pigment, is preferably from 0.01 to 0.5, more preferably from 0.05 to 0.3, and even more preferably from 0.1 to 0.2.

Relative to the total mass of the ink, the oil-insoluble resin is preferably included in an amount of about 0.1 to 5% by mass, and more preferably 0.5 to 2.0% by mass.

In addition to the various components described above, the ink of the present invention may also include one or more additives.

Examples of these additives include surfactants and antioxidants and the like. Examples of the surfactants include anionic surfactants, cationic surfactants, amphoteric surfactants and nonionic surfactants. Examples of the antioxidants include dibutylhydroxytoluene, propyl gallate, tocopherol, butylhydroxyanisole, and nordihydroguaiaretic acid.

For example, when the ink is produced by a method that uses in-oil drying of a water-in-oil emulsion, although water is sometimes used in the production process for the ink, the water is preferably removed during the ink production process.

The amount of water in the ink, relative to the total mass of the ink, is preferably not more than 1% by mass, more preferably less than 1% by mass, even more preferably not more than 0.5% by mass, and still more preferably 0.1% by mass or less.

When used in an inkjet recording system, the suitable range for the ink viscosity varies depending on factors such as the diameter of the nozzles within the discharge head and the discharge environment, but generally, the viscosity at 23° C. is preferably within a range from 5 to 30 mPa·s, more preferably from 5 to 15 mPa·s, and even more preferably about 10 mPa·s.

There are no particular limitations on the ink production method.

For example, in the case of an ink containing a pigment, the ink can be prepared by mixing the pigment, the oil-soluble resin A, the non-aqueous solvent and other components that may be added as required, dispersing the pigment using an arbitrary dispersion device such as a ball mill or a beads mill, and if desired, subsequently passing the resulting dispersion through a conventional filtration device such as a membrane filter. In terms of the other components, in a case in which a polyethyleneimine oil-insoluble resin is used, the polyethyleneimine is often only sparingly soluble or almost insoluble in typical non-aqueous solvents. Accordingly, it is preferable that mixing is performed in a state in which a shearing force is applied, by using a device such as a beads mill that is capable of imparting shearing force. In a case in which the oil-insoluble resin is soluble in the non-aqueous solvent being used, this type of shearing force is unnecessary, but mixing is preferably conducted under stirring.

In those cases in which the ink contains colored resin particles containing a colorant and a resin, an in-liquid drying method can be used favorably for production of the ink, and in-oil drying of a water-in-oil (W/O) emulsion can be used particularly favorably.

One example of a method for producing the oil-based inkjet ink using in-oil drying of a water-in-oil emulsion includes producing a water-in-oil emulsion containing a continuous phase containing a non-aqueous solvent and the oil-soluble resin A, and a dispersed phase containing water, a colorant and a water-dispersible resin (hereafter sometimes referred to as "step 1"), and then removing the water from the water-in-oil emulsion (hereafter sometimes referred to as "step 2").

The non-aqueous solvent, the oil-soluble resin A, the colorant and the water-dispersible resin used in this production method are as described above in relation to the aforementioned ink. As the water, tap water, ion-exchanged water, deionized water or the like may be used.

In step 1, the continuous phase and the dispersed phase may each contain one or more other components. For example, the dispersed phase may also contain a pigment dispersant or the like. Examples of the pigment dispersant in the dispersed phase include the same materials as those described above in relation to components that may be included in the colored resin particles in the ink.

The amount of the colorant, relative to the total mass of the dispersed phase, is preferably from 1 to 40% by mass, and more preferably from 5 to 30% by mass. The amount of the colorant relative to the total mass of the water-in-oil emulsion is preferably from 0.1 to 20% by mass, and more preferably from 1 to 10% by mass.

The amount (of the solid fraction) of the water-dispersible resin, relative to the total mass of the dispersed phase, is preferably from 0.1 to 40% by mass, and more preferably from 1 to 30% by mass. The amount of the water-dispersible resin relative to the total mass of the water-in-oil emulsion is preferably from 0.1 to 20% by mass, and more preferably from 1 to 10% by mass.

The amount of water relative to the total mass of the dispersed phase is preferably from 40 to 90% by mass, and more preferably from 50 to 80% by mass. The amount of water relative to the total mass of the water-in-oil emulsion is preferably from 1 to 50% by mass, more preferably from 5 to 50% by mass, and even more preferably from 10 to 40% by mass.

In the water-in-oil emulsion produced in step 1, when a pigment dispersant is included in the dispersed phase, the amount of the pigment dispersant relative to the total mass of the dispersed phase is preferably from 0.1 to 20% by mass, and more preferably from 1 to 10% by mass. The amount of the pigment dispersant in the dispersed phase relative to the total mass of the water-in-oil emulsion is preferably from 0.1 to 10% by mass, and more preferably from 0.5 to 5% by mass. When a water-soluble nonionic dispersant is included as a pigment dispersant in the dispersed phase, the amount of the water-soluble nonionic dispersant relative to the total mass of all pigment dispersants in the dispersed phase is preferably from 50 to 100% by mass, and more preferably from 70 to 100% by mass.

The amount of the oil-soluble resin A, relative to the total mass of the continuous phase, is preferably from 0.1 to 10% by mass, and more preferably from 0.2 to 5% by mass. The amount of the oil-soluble resin A relative to the total mass of the water-in-oil emulsion is preferably from 0.1 to 10% by mass, and more preferably from 0.5 to 5% by mass.

The amount of the non-aqueous solvent, relative to the total mass of the continuous phase, is preferably from 70 to 99% by mass, and more preferably from 80 to 99% by mass. The amount of the non-aqueous solvent relative to the total mass of the water-in-oil emulsion is preferably from 30 to 80% by mass, and more preferably from 40 to 70% by mass.

In step 1, the water-in-oil emulsion can be produced, for example, by mixing the aforementioned dispersed phase components and the aforementioned continuous phase components, and then emulsifying the mixture.

A mixture for the continuous phase and a mixture for the dispersed phase are preferably prepared separately in advance. Subsequently, the mixture for the dispersed phase is preferably added to the mixture for the continuous phase and an emulsification treatment then performed. The emulsification treatment may be performed using an ultrasonic homogenizer or the like while the mixture for the dispersed phase is being added to the mixture for the continuous phase, or the emulsification may be performed after addition of the dispersed phase to the continuous phase.

In step 1, the composition of the water-in-oil emulsion prior to removal of the water, expressed as a mass ratio, preferably contains 20 to 50% by mass of the dispersed phase and 80 to 50% by mass of the continuous phase, relative to the total mass of the water-in-oil emulsion.

In step 2, the water of the dispersed phase in the water-in-oil emulsion is removed. This yields colored resin particles containing a dispersed phase from which water has been removed.

Examples of methods that may be used for removing the water include applying reducing pressure and/or heating, promoting evaporation by bubbling a gas through the liquid, and methods that combine these methods. The reduced pressure and/or heating conditions employed may be selected so that the water is removed, but the non-aqueous solvent of the continuous phase is retained. The reduced pressure method may, for example, use an evaporator. The heating temperature is preferably at least 30° C., more preferably from 40 to 100° C., and even more preferably from 60 to 90° C.

In step 2, the amount of water removed from the dispersed phase relative to the amount of water prior to removal is preferably at least 80% by mass, more preferably at least 90% by mass, even more preferably at least 95% by mass, and still more preferably 99% by mass or more.

There are no particular limitations on the printing method used with the inkjet inks, and any of various printing systems, including a piezo system, electrostatic system or thermal system may be used. In those cases in which an inkjet recording device is used, the ink of an embodiment of the present invention is preferably discharged from the inkjet head based on a digital signal, with the discharged ink droplets being adhered to the recording medium.

There are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

Embodiments of the present invention include the following embodiments, but the present invention is not limited to the embodiments described below.

<1> An oil-based inkjet ink comprising:
a colorant,
an oil-soluble resin that is an acrylic-based polymer having a side chain containing a polydimethylsiloxane structure, and
a non-aqueous solvent.

<2> An oil-based inkjet ink comprising:
a pigment,
an oil-soluble resin that is an acrylic-based polymer having a side chain containing a polydimethylsiloxane structure, and
a non-aqueous solvent.

<3> The oil-based inkjet ink according to <1> or <2>, wherein the non-aqueous solvent comprises a silicone oil.

<4> The oil-based inkjet ink according to <3>, wherein the silicone oil comprises an alkyl-modified silicone oil.

<5> The oil-based inkjet ink according to <3> or <4>, wherein the non-aqueous solvent comprises the silicone oil in an amount of 10 to 100% by mass relative to a total mass of the non-aqueous solvent.

<6> The oil-based inkjet ink according to any one of <1> to <5>, wherein within the oil-soluble resin, an amount of a structural unit having a side chain containing the polydimethylsiloxane structure, relative to a total of all structural units of the oil-soluble resin, is from 10 to 40% by mass.

<7> The oil-based inkjet ink according to any one of <1> to <6>, comprising colored resin particles containing the colorant and a resin.

<8> The oil-based inkjet ink according to <7>, wherein the resin of the colored resin particles comprises an acidic resin.

<9> The oil-based inkjet ink according to any one of <1> to <8>, wherein the oil-soluble resin has a basic group.

<10> The oil-based inkjet ink according to any one of <1> to <9>, wherein the oil-soluble resin has an alkyl group of 8 to 18 carbon atoms and/or a β-dicarbonyl group.

<11> A method for producing an oil-based inkjet ink, the method comprising: producing a water-in-oil emulsion comprising a continuous phase containing a non-aqueous solvent and an oil-soluble resin that is an acrylic-based polymer having a side chain containing a polydimethylsiloxane structure, and a dispersed phase containing water, a colorant and a water-dispersible resin, and removing the water from the water-in-oil emulsion.

EXAMPLES

The present invention is described below in further detail based on a series of examples, but the present invention is not limited to only these examples. Unless specifically stated otherwise, "%" means "% by mass".

Examples 1 to 12 and Comparative Examples 1 to 3

<Ink Production>
(Production of Resin Solutions a to g)

A 300 ml four-neck flask was charged with 87.5 g of isotridecyl isononanoate (manufactured by Kokyu Alcohol Kogyo Co., Ltd.), and the temperature was raised to 110° C. while stirring was performed under a stream of nitrogen gas. Next, with the temperature held at 110° C., a mixture prepared by mixing 16.7 g of isotridecyl isononanoate and 4 g of Perbutyl O (t-butylperoxy-2-ethylhexanoate (manufactured by NOF Corporation)) with 100.0 g of a monomer mixture having the composition shown in Table 1 was added dropwise to the flask over a period of three hours. Subsequently, stirring was continued for one hour with the temperature held at 110° C., 0.2 g of Perbutyl O was then added, and stirring was continued for an additional one hour with the temperature held at 110° C. Accordingly, a series of resin solutions a to g, each having a solid fraction of 50% by mass, was obtained. The blend amount of each material shown in Table 1 indicates "% by mass".

TABLE 1

| Resin solution | a | b | c | d | e | f | g |
|---|---|---|---|---|---|---|---|
| SMA | 50 | 30 | 50 | 65 | 25 | | 50 |
| EHMA | | 20 | | | | | 20 |
| Methacrylic-modified silicone oil 1 | 20 | | | | | | |
| Methacrylic-modified silicone oil 2 | | 20 | | 5 | 45 | 70 | |
| Methacrylic-modified silicone oil 3 | | | 20 | | | | |
| BZA | | | 15 | 15 | 5 | 15 | 15 |
| GMA | 15 | 15 | 15 | 15 | | 15 | 15 |
| AAEM | 15 | 15 | | | 25 | | |
| Total (monomer mixture, % by mass) | 100 | 100 | 100 | 100 | 100 | 100 | 100 |

The materials shown in Table 1 are as follows.

SMA: stearyl methacrylate (manufactured by Shin-Nakamura Chemical Co., Ltd.)

EHMA: 2-ethylhexyl methacrylate (manufactured by Mitsubishi Chemical Corporation)

Methacrylic-modified silicone oil 1: X-22-2404 (manufactured by Shin-Etsu Chemical Co., Ltd.)

Methacrylic-modified silicone oil 2: X-22-174ASX (manufactured by Shin-Etsu Chemical Co., Ltd.)

Methacrylic-modified silicone oil 3: X-22-174BX (manufactured by Shin-Etsu Chemical Co., Ltd.)

BZA: benzyl acrylate (manufactured by Osaka Organic Chemical Industry Ltd.)

GMA: glycidyl methacrylate (manufactured by NOF Corporation)

AAEM: acetoacetoxy ethyl methacrylate (manufactured by The Nippon Synthetic Chemical Industry Co., Ltd.)

(Production of Resin Solution h)

A 500 ml four-neck flask was charged with 200.0 g of the resin solution g, and the temperature was raised to 110° C. while stirring was performed under a stream of nitrogen gas. Next, 2.8 g of diethanolamine (manufactured by Nippon Shokubai Co., Ltd.) was added, and after stirring for one hour with the temperature held at 110° C., a urethanization catalyst (bismuth neodecanoate, manufactured by Wako Pure Chemical Industries, Ltd.) was added, and a mixture of 7.8 g of TAKENATE 600 (1,3-bis(isocyanatomethyl)cyclohexane, manufactured by Mitsui Chemicals, Inc.), 14.0 g of KF-6000 (a carbinol-modified silicone oil, manufactured by Shin-Etsu Silicones Co., Ltd.) and 87.0 g of isotridecyl isononanoate (manufactured by Kokyu Alcohol Kogyo Co., Ltd.) was added dropwise to the flask over a period of one hour. Following completion of the dropwise addition, reaction was continued at 110° C. for four hours, and the resulting mixture was then cooled to obtain a resin solution h having a solid fraction of 40% by mass. The composition of the above materials (excluding the urethanization catalyst) used in the production of the resin solution h is shown in Table 2. In Table 2, the "Diisocyanate" indicates the TAKENATE 600. The units for the blend amount of each material in Table 2 are grams (g).

(Production of Resin Solution i)

A 500 ml four-neck flask was charged with 200.0 g of the resin solution a, and the temperature was raised to 110° C. while stirring was performed under a stream of nitrogen gas. Next, 2.8 g of diethanolamine (manufactured by Nippon Shokubai Co., Ltd.) was added, and after stirring for one hour with the temperature held at 110° C., a urethanization catalyst (bismuth neodecanoate, manufactured by Wako Pure Chemical Industries, Ltd.) was added, and a mixture containing 7.8 g of TAKENATE 600 (1,3-bis(isocyanatomethyl)cyclohexane, manufactured by Mitsui Chemicals, Inc.), 4.0 g of 1,3-propanediol (manufactured by Tokyo Chemical Industry Co., Ltd.) and 72.0 g of isotridecyl isononanoate (manufactured by Kokyu Alcohol Kogyo Co., Ltd.) was added dropwise to the flask over a period of one hour. Following completion of the dropwise addition, reaction was continued at 110° C. for four hours, and the product was then cooled to obtain a resin solution i having a solid fraction of 40% by mass. The composition of the above materials (excluding the urethanization catalyst) used in the production of the resin solution i is shown in Table 2.

TABLE 2

| Resin solution | h | i |
|---|---|---|
| Resin solution g (solid fraction: 50% by mass) | 200.0 | |
| Resin solution a (solid fraction: 50% by mass) | | 200.0 |
| Diethanolamine | 2.8 | 2.8 |
| 1,3-propanediol | | 4.0 |
| KF-6000 | 14.0 | |
| Diisocyanate | 7.8 | 7.8 |
| Isotridecyl isononanoate | 87.0 | 72.0 |
| Total (units: g) | 311.6 | 286.6 |
| Solid fraction (% by mass) | 40.0 | 40.0 |

(Ink Production)

Mixtures having the formulations shown in Tables 3 and 4 were each dispersed using a Dyno-Mill (manufactured by Shinmaru Enterprises Corporation) filled with zirconia beads (diameter: 0.5 mm) at a packing ratio of 85%, under conditions including a residence time of 15 minutes, thus producing an ink.

In Tables 3 and 4, the "ratio of the polydimethylsiloxane structure relative to the oil-soluble resin A solid fraction" describes the amount of the structural unit having a side chain containing the polydimethylsiloxane structure relative to the total of all the structural units of the oil-soluble resin A, and is a numerical value calculated as the ratio (% by mass) of the total mass of the raw material compounds that constitute the structural unit having a side chain containing the polydimethylsiloxane structure, relative to the total mass of all the raw material compounds that constitute the oil-soluble resin A.

The materials in Tables 3 and 4 are as follows. In Tables 3 and 4, the amounts of the resin solutions a to i each indicate an amount as a solution.

Carbon black 1: NEROX 600, manufactured by Evonik Japan Co., Ltd.

Carbon black 2: MA8, manufactured by Mitsubishi Chemical Corporation

S18000: Solsperse 18000 (a fatty acid amine-based dispersant), manufactured by The Lubrizol Corporation Polyethyleneimine: EPOMIN SP-018, manufactured by Nippon Shokubai Co., Ltd.

Fatty acid ester-based solvent: SALACOS 913 (isotridecyl isononanoate, boiling point: 356° C.), manufactured by The Nisshin OilliO Group, Ltd.

Higher alcohol-based solvent: RISONOL 16SP (hexyldecanol, boiling point: about >285° C.), manufactured by Kokyu Alcohol Kogyo Co., Ltd.

Silicone oil 1: KF-96A-6CS (a dimethyl silicone oil, boiling point: about >350° C.), manufactured by Shin-Etsu Chemical Co., Ltd.

Silicone oil 2: SILSOFT 034 (3-octylheptamethyltrisiloxane (caprylyl methicone), boiling point: 260° C.), manufactured by Momentive Performance Materials Japan Co., Ltd.

Petroleum-based hydrocarbon solvent: MORESCO White P-60 (initial boiling point: 168° C. (10 mmHg)), manufactured by MORESCO Corporation <Evaluations>

Using the inks of examples and comparative examples obtained as described above, the evaluations described below were performed. The results are shown in Tables 3 and 4.

(Discharge Performance)

Printed items were obtained by loading the ink into a line-type inkjet printer ORPHIS EX9050 (manufactured by RISO KAGAKU CORPORATION), and printing a solid image of about 51 mm in the main scanning direction (600 nozzles)×260 mm in the sub-scanning direction onto a plain paper "RISO Paper Thin Type" (manufactured by RISO KAGAKU CORPORATION).

Unprinted portions caused by ink discharge faults are observed as white bands, and the level of occurrence of these white bands across 10 printed items was used to evaluate the discharge performance against the following criteria.

S: total number of white bands across 10 printed items of 0 to 5
A: total number of white bands across 10 printed items of 6 to 9
B: total number of white bands across 10 printed items of 10 or more (Ink Storage Stability)

Each ink was placed in a sealed container and left to stand for four weeks in an environment at 70° C. The ink viscosity prior to this standing period (the initial viscosity) and the ink viscosity after the standing period (viscosity after 4 weeks) were measured, and the change in viscosity was determined using the formula below. Based on this change in viscosity, the storage stability was evaluated against the following criteria.

The ink viscosity refers to the viscosity at 23° C., and was measured using an MCR302 device manufactured by Anton Paar GmbH (cone angle: 1°, diameter: 50 mm).

Change in viscosity=[(viscosity after 4 weeks×100)/(initial viscosity)]−100(%)

S: change in viscosity of less than ±5%
A: change in viscosity of at least ±5% but less than ±10%
B: change in viscosity of ±10% or more (Clear File Deformation)

A printed item was obtained by loading the ink into a line-type inkjet printer ORPHIS EX9050 (manufactured by RISO KAGAKU CORPORATION), and printing a solid image of about 51 mm in the main scanning direction (600 nozzles)×260 mm in the sub-scanning direction onto a plain paper "RISO Paper Thin Type" (manufactured by RISO KAGAKU CORPORATION).

Evaluation of clear file deformation was performed by inserting a single printed item into a PP (polypropylene) clear file, and after standing for one week at room temperature, ascertaining the amount of deformation in the clear file.

The thickness of a single clear file sheet was 0.2 mm.

The amount of deformation in the clear file was determined by laying the clear file on a flat surface, and measuring the maximum height that the clear file had been deformed and lifted from the flat surface.

S: amount of deformation of the clear file of less than 1 cm
A: amount of deformation of the clear file of at least 1 cm but less than 5 cm
B: amount of deformation of the clear file of 5 cm or more (Image Density and Strike-Through)

A printed item was obtained by loading the ink into a line-type inkjet printer ORPHIS EX9050 (manufactured by RISO KAGAKU CORPORATION), and printing a solid image of about 51 mm in the main scanning direction (600 nozzles)×260 mm in the sub-scanning direction onto a plain paper "RISO Paper Thin Type" (manufactured by RISO KAGAKU CORPORATION).

The OD value of the printed surface (image density) and the OD value of the rear surface (strike-through) of the obtained printed item were measured using an optical densitometer (RD920, manufactured by Macbeth Corporation) and evaluated against the following criteria.

Printed Surface OD Value (Image Density)
S: 1.12 or greater
A: at least 1.00 but less than 1.12
B: less than 1.00

Rear Surface OD Value (Strike-Through)
S: less than 0.08
A: at least 0.08 but less than 0.15
B: 0.15 or greater

TABLE 3

| | (% by mass) | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Pigment | Carbon black 1 | 10 | 10 | 10 | 10 | 10 | | 10 | 10 | 10 | 10 | 10 | 10 |
| | Carbon black 2 | | | | | | 10 | | | | | | |
| Oil-soluble resin | Resin solution a (solid fraction: 50% by mass) | 8 | | | | | | | | | | | |
| | Resin solution b (solid fraction: 50% by mass) | | 8 | | 8 | | | 8 | 8 | 8 | | | |
| | Resin solution c (solid fraction: 50% by mass) | | | 8 | | | | | | | | | |
| | Resin solution d (solid fraction: 50% by mass) | | | | | 8 | | | | | | | |
| | Resin solution e (solid fraction: 50% by mass) | | | | | | 8 | | | | | | |

TABLE 3-continued

| (% by mass) | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| | Resin solution f (solid fraction: 50% by mass) | | | | | | | | | | 8 | | |
| | Resin solution g (solid fraction: 50% by mass) | | | | | | | | | | | | |
| | Resin solution h (solid fraction: 40% by mass) | | | | | | | | | | | 8 | |
| | Resin solution i (solid fraction: 40% by mass) | | | | | | | | | | | | 8 |
| | S18000 | | | | | | | | | | | | 2 |
| Oil-insoluble resin | Polyethyleneimine | 2 | 2 | 2 | 2 | 2 | 2 | 2 | 2 | 2 | 2 | 2 | |
| Non-aqueous solvent | Fatty acid ester-based solvent | 30 | 30 | 30 | 65 | 30 | 30 | 30 | 70 | | 70 | 70 | 70 |
| | Higher alcohol-based solvent | | | | | | | | | 10 | 10 | 10 | 10 |
| | Silicone oil 1 | | | | | | | 50 | | | | | |
| | Silicone oil 2 | 50 | 50 | 50 | 15 | 50 | 50 | | | | | | |
| | Petroleum-based hydrocarbon solvent | | | | | | | | | 70 | | | |
| | Total (% by mass) | 100 | 100 | 100 | 100 | 100 | 100 | 100 | 100 | 100 | 100 | 100 | 100 |
| | Ratio of polydimethylsiloxane structure relative to oil-soluble resin A solid fraction (% by mass) | 20 | 20 | 20 | 20 | 5 | 45 | 20 | 20 | 20 | 70 | 20 | 17 |
| | Discharge performance | S | S | S | S | S | S | A | A | A | A | A | A |
| | Ink storage stability (70° C., 1 month) | S | S | S | S | S | S | S | S | S | A | S | S |
| | Clear file deformation | S | S | S | S | S | S | S | A | A | A | A | A |
| | Image density (printed surface OD value) | S | S | S | S | S | S | S | S | S | S | S | A |
| | Strike-through (rear surface OD value) | S | S | S | S | A | A | A | A | A | A | A | A |

TABLE 4

| (% by mass) | | Comparative Example 1 | Comparative Example 2 | Comparative Example 3 |
|---|---|---|---|---|
| Pigment | Carbon black 1 | 10 | 10 | 10 |
| | Carbon black 2 | | | |
| Oil-soluble resin | Resin solution a (solid fraction: 50% by mass) | | | |
| | Resin solution b (solid fraction: 50% by mass) | | | |
| | Resin solution c (solid fraction: 50% by mass) | | | |
| | Resin solution d (solid fraction: 50% by mass) | | | |
| | Resin solution e (solid fraction: 50% by mass) | | | |
| | Resin solution f (solid fraction: 50% by mass) | | | |
| | Resin solution g (solid fraction: 50% by mass) | 8 | 8 | |
| | Resin solution h (solid fraction: 40% by mass) | | | |
| | Resin solution i (solid fraction: 40% by mass) | | | |
| | S18000 | | 2 | 6 |
| Oil-insoluble resin | Polyethyleneimine | | | 2 |
| Non-aqueous solvent | Fatty acid ester-based solvent | 70 | 70 | 74 |
| | Higher alcohol-based solvent | 10 | 10 | 10 |
| | Silicone oil 1 | | | |
| | Silicone oil 2 | | | |
| | Petroleum-based hydrocarbon solvent | | | |
| | Total (% by mass) | 100 | 100 | 100 |
| | Ratio of polydimethylsiloxane structure relative to oil-soluble resin A solid fraction (% by mass) | 0 | 0 | 0 |
| | Discharge performance | B | B | B |
| | Ink storage stability (70° C., 1 month) | S | S | S |
| | Clear file deformation | A | A | A |
| | Image density (printed surface OD value) | A | S | A |
| | Strike-through (rear surface OD value) | A | A | A |

As is evident from Tables 3 and 4, Examples 1 to 12 which used an oil-soluble resin having a side chain containing a polydimethylsiloxane structure exhibited superior discharge properties compared with the comparative examples.

Examples 13 to 22, and Comparative Examples 4 and 5

<Ink Production>
(Production of Resin Solutions 1 to 5)

A 300 ml four-neck flask was charged with 50 g of EXCEPARL M-OL (methyl oleate, manufactured by Kao Corporation), and the temperature was raised to 110° C. while stirring was performed under a stream of nitrogen gas. Next, with the temperature held at 110° C., a mixture prepared by mixing 25 g of EXCEPARL M-OL and 6 g of Perbutyl O (t-butylperoxy-2-ethylhexanoate (manufactured by NOF Corporation)) with 100.0 g of a monomer mixture having the composition shown in Table 5 was added dropwise to the flask over a period of three hours. Subsequently, stirring was continued for one hour with the temperature held at 110° C., 0.6 g of Perbutyl O was then added, and stirring was continued for an additional one hour with the temperature held at 110° C. Additional EXCEPARL M-OL was then added to adjust the solid fraction to 50% by mass, thus obtaining a series of resin solutions 1 to 5. The blend amount of each material shown in Table 5 indicates "% by mass".

TABLE 5

| Resin solution | 1 | 2 | 3 | 4 | 5 |
|---|---|---|---|---|---|
| VMA | 30 | 30 | 35 | 10 | 30 |
| LMA | 20 | 20 | 30 | 10 | 20 |
| GMA | 10 | 10 | 10 | 10 | |
| AAEM | 20 | 20 | 20 | 20 | 20 |
| ACMO | | | | | 10 |
| Methacrylic-modified silicone oil 3 | 20 | | | | |
| Methacrylic-modified silicone oil 2 | | 20 | 5 | 50 | 20 |
| Total (monomer mixture, % by mass) | 100 | 100 | 100 | 100 | 100 |

The materials shown in Table 5 are as follows.

VMA: behenyl methacrylate (manufactured by NOF Corporation)

LMA: lauryl methacrylate (manufactured by Kao Corporation)

GMA: glycidyl methacrylate (manufactured by NOF Corporation)

AAEM: acetoacetoxy ethyl methacrylate (manufactured by The Nippon Synthetic Chemical Industry Co., Ltd.)

ACMO: acryloylmorpholine (manufactured by KJ Chemicals Corporation)

Methacrylic-modified silicone oil 3: X-22-174BX (manufactured by Shin-Etsu Chemical Co., Ltd.)

Methacrylic-modified silicone oil 2: X-22-174ASX (manufactured by Shin-Etsu Chemical Co., Ltd.)

(Production of Resin Solutions 6 to 9)

Resin solutions 6 to 9 were produced using the resin solutions 1 to 4.

A 500 ml four-neck flask was charged with 200 g of one of the produced resin solutions as shown in Table 6, and the temperature was raised to 110° C. while stirring was performed under a stream of nitrogen gas. Next, 7.4 g of diethanolamine (manufactured by Nippon Shokubai Co., Ltd.) was added, and after stirring for one hour with the temperature held at 110° C., EXCEPARL M-OL (methyl oleate, manufactured by Kao Corporation) was then added to adjust the solid fraction to 50% by mass, thus obtaining resin solutions 6 to 9. The units for the blend amount of each material in Table 6 are grams (g).

TABLE 6

| Resin solution | 6 | 7 | 8 | 9 |
|---|---|---|---|---|
| Resin solution 1 (solid fraction: 50% by mass) | 200 | | | |
| Resin solution 2 (solid fraction: 50% by mass) | | 200 | | |
| Resin solution 3 (solid fraction: 50% by mass) | | | 200 | |
| Resin solution 4 (solid fraction: 50% by mass) | | | | 200 |
| Diethanolamine | 7.4 | 7.4 | 7.4 | 7.4 |
| EXCEPARL M-OL | 7.4 | 7.4 | 7.4 | 7.4 |
| Total (units: g) | 214.8 | 214.8 | 214.8 | 214.8 |

(Ink Production)

Inks of Examples 13 to 22 and Comparative Example 4 were produced in the following manner.

In Tables 7 to 9, the materials used in each ink and the blend amounts of those materials are divided into the materials of the dispersed phase and the materials of the continuous phase.

The materials of the continuous phase (the solution of the oil-soluble resin A or the comparative dispersant, and the non-aqueous solvent) were mixed in the blend amounts shown in Tables 7 to 9 to prepare a mixture for the continuous phase.

Next, of the materials shown for the dispersed phase, the colorant, the purified water, and the pigment dispersant in those cases in which a pigment dispersant is included, were mixed together in the blend amounts shown in Tables 7 to 9, and were then dispersed using a beads mill (Dyno-Mill Multi LAB, manufactured by Shinmaru Enterprises Corporation), a resin emulsion shown in Tables 7 to 9 was added to the obtained dispersion composition in the amount shown in Tables 7 to 9, and the resulting mixture was stirred with a magnetic stirrer. The resulting liquid was used as a mixture for the dispersed phase.

With the mixture for the continuous phase undergoing stirring with a magnetic stirrer, the prepared mixture for the dispersed phase was added dropwise to the mixture for the continuous phase while ice cooling and irradiation from an ultrasonic homogenizer "Ultrasonic Processor VC-750" (manufactured by Sonics & Materials, Inc.) was performed for 10 minutes, thus obtaining a water-in-oil (W/O) emulsion.

Water was removed from the obtained emulsion under reduced pressure using an evaporator, thus obtaining a colored resin particles dispersion. The water removal rate was substantially 100% by mass. This colored resin particles dispersion was used without further modification as an ink. In Comparative Example 4, a colored resin particles dispersion could not be produced.

The compositions of the inks of Examples 13 to 22 and Comparative Examples 4 and 5 following water removal are shown in Tables 10 to 12.

The materials shown in Tables 7 to 12 are as follows. The blend amounts of the materials shown in Tables 7 to 9 represent "parts by mass". The blend amounts of the materials shown in Tables 10 to 12 represent "% by mass". The blend amounts of the materials shown in Tables 7 to 12 are amounts that include the volatile fraction in the case of components that contain a volatile fraction. In Tables 7 to 12, the amounts of the resin solutions 5 to 9 are amounts of solutions containing a volatile fraction. In Tables 7 to 9, the amounts shown for the "resin emulsions" (urethanes 1 to 3) are amounts that include a volatile fraction, whereas in Tables 10 to 12, the amounts shown for the "resins" (urethanes 1 to 3) indicate amounts following removal of the water from the resin emulsion.

Carbon black 3: MOGUL L, manufactured by Cabot Specialty Chemicals, Inc.

Dimethyl quinacridone pigment: CFR321-1(S), manufactured by Dainichiseika Color & Chemicals Mfg. Co., Ltd.

Copper phthalocyanine blue pigment: PV Fast Blue BG, manufactured by Clariant Japan K.K.

Direct dye: Water Blue 3, manufactured by Orient Chemical Industries, Ltd.

Water-soluble nonionic dispersant 1: Borchi Gen 12 (active ingredient: 100%), manufactured by Borchers GmbH Water-soluble nonionic dispersant 2: Borchi Gen DFN (an aryl alkyl biphenylol polyglycol ether, active ingredient: 100%), manufactured by Borchers GmbH Urethane 1: DAOTAN VTW1265 (a water dispersion of an acidic urethane-urea (meth)acrylic resin, active ingredient: 36%), manufactured by Daicel Allnex Ltd.

Urethane 2: WS5984 (a water dispersion of an acidic urethane-urea resin, active ingredient: 40%)

Urethane 3: SUPERFLEX 150H (a water dispersion of an acidic urethane-urea resin, active ingredient: 38%) manufactured by DKS Co., Ltd.

S28000: Solsperse 28000 (a polyamide-based dispersant) (active ingredient: 100% by mass), manufactured by The Lubrizol Corporation ES5600: ES-5600 (cetyl diglyceryl tris(trimethylsiloxy) silylethyl dimethicone (active ingredient: 100% by mass), manufactured by Dow Corning Toray Co., Ltd.

Petroleum-based hydrocarbon solvent 1: MORESCO White P-60, manufactured by MORESCO Corporation Fatty acid ester-based solvent 1: methyl oleate (manufactured by FUJIFILM Wako Pure Chemical Corporation Fatty acid ester-based solvent 2: ethylhexyl palmitate (manufactured by FUJIFILM Wako Pure Chemical Corporation Silicone oil 2: SILSOFT 034 (3-octylheptamethyltrisiloxane (caprylyl methicone), boiling point: 260° C.), manufactured by Momentive Performance Materials Japan Co., Ltd.

<Evaluations>

Using the inks obtained in the various examples and comparative examples, the evaluations described below were performed. The results are shown in Tables 10 to 12.

(Discharge Performance)

The discharge performance was evaluated using the same method as that described for Examples 1 to 12 and Comparative Examples 1 to 3.

(Ink Storage Stability)

The ink storage stability was evaluated using the same method as that described for Examples 1 to 12 and Comparative Examples 1 to 3.

(Clear File Deformation)

Clear file deformation was evaluated using the same method as that described for Examples 1 to 12 and Comparative Examples 1 to 3.

(Image Density)

Printed items were obtained using the same method as that described for Examples 1 to 12 and Comparative Examples 1 to 3.

For a printed item obtained using an ink containing the carbon black 3, the OD value (image density) of the printed surface of the printed item was measured using an optical densitometer (RD920, manufactured by Macbeth Corporation), and the image density was evaluated against the following criteria.

Printed Surface OD Value (Image Density)
S: 1.12 or greater
A: at least 1.00 but less than 1.12
B: less than 1.00

For a printed item obtained using an ink containing the dimethyl quinacridone pigment, the copper phthalocyanine blue pigment or the direct dye, the chroma of the printed surface of the printed item was measured using a spectral density and color meter (eXact, manufactured by Videojet X-Rite K.K.), the difference in the chroma value from that of Comparative Example 5 was determined, and an evaluation was performed against the following criteria.

The chroma is represented by the following formula, as prescribed in the CIE (1976) L*a*b* color space defined by the International Commission on Illumination.

$$\text{Chroma } c^* = \{(a^*)^2 + (b^*)^2\}^{1/2}$$

Coloration, Chroma
S: difference in chroma from Comparative Example 5 of 10 or greater
A: difference in chroma from Comparative Example 5 of at least 3 but less than 10
B: difference in chroma from Comparative Example 5 of less than 3

(Strike-Through)

Strike-through was evaluated using the same method as that described for Examples 1 to 12 and Comparative Examples 1 to 3.

(Roller Transfer Contamination)

One hundred printed items were obtained by loading the ink into an inkjet printer ORPHIS GD9630 (manufactured by RISO KAGAKU CORPORATION), and printing a solid image of about 51 mm in the main scanning direction (600 nozzles)×260 mm in the sub-scanning direction onto 100 sheets of a plain paper "RISO Paper Multi" (manufactured by RISO KAGAKU CORPORATION). The thus obtained 100 printed items were inspected visually, and evaluated against the following criteria.

S: almost no contamination is visible around the image periphery
A: slight contamination is visible around the image periphery
B: contamination is visible around the image periphery When Example 1 was also evaluated for roller transfer contamination in the manner described above, the evaluation result was B.

TABLE 7

| (parts by mass) | | | Example 13 | Example 14 | Example 15 | Example 16 | Example 17 |
|---|---|---|---|---|---|---|---|
| Dispersed phase | Colorant | Carbon black 3 | 6.0 | | | 6.0 | |
| | | Dimethyl quinacridone pigment | | 6.0 | | | |
| | | Copper phthalocyanine blue pigment | | | 6.0 | | |
| | | Direct dye | | | | | 6.0 |

TABLE 7-continued

| | (parts by mass) | | Example 13 | Example 14 | Example 15 | Example 16 | Example 17 |
|---|---|---|---|---|---|---|---|
| | Pigment dispersant | Water-soluble nonionic dispersant 1 | 3.0 | 3.0 | 3.0 | 3.0 | |
| | | Water-soluble nonionic dispersant 2 | | | | | |
| | Resin emulsion | Urethane 1 (active ingredient: 36% by mass) | 11.1 | 11.1 | | 11.1 | 11.1 |
| | | Urethane 2 (active ingredient: 40% by mass) | | | | | |
| | | Urethane 3 (active ingredient: 38% by mass) | | | 10.5 | | |
| | | Purified water | 22.9 | 22.9 | 23.5 | 22.9 | 22.9 |
| Continuous phase | Solution of oil-soluble resin A | Resin solution 6 (active ingredient: 50% by mass) | 6.0 | 6.0 | 6.0 | 6.0 | 6.0 |
| | | Resin solution 7 (active ingredient: 50% by mass) | | | | | |
| | | Resin solution 8 (active ingredient: 50% by mass) | | | | | |
| | | Resin solution 9 (active ingredient: 50% by mass) | | | | | |
| | | Resin solution 5 (active ingredient: 50% by mass) | | | | | |
| | Comparative dispersant | S28000 | | | | | |
| | | ES5600 | | | | | |
| | Non-aqueous solvent | Petroleum-based hydrocarbon solvent 1 | 20.0 | 20.0 | 20.0 | 31.0 | 30.0 |
| | | Fatty acid ester-based solvent 1 | 41.0 | 41.0 | 41.0 | 50.0 | 24.0 |
| | | Fatty acid ester-based solvent 2 | | | | | 30.0 |
| | | Silicone oil 2 | 20.0 | 20.0 | 20.0 | | |
| | Total (parts by mass) | | 130.0 | 130.0 | 130.0 | 130.0 | 130.0 |

TABLE 8

| | (parts by mass) | | Example 18 | Example 19 | Example 20 | Example 21 | Example 22 |
|---|---|---|---|---|---|---|---|
| Dispersed phase | Colorant | Carbon black 3 | 6.0 | 6.0 | 6.0 | 6.0 | 6.0 |
| | | Dimethyl quinacridone pigment | | | | | |
| | | Copper phthalocyanine blue pigment | | | | | |
| | | Direct dye | | | | | |
| | Pigment dispersant | Water-soluble nonionic dispersant 1 | 3.0 | 3.0 | 3.0 | 3.0 | |
| | | Water-soluble nonionic dispersant 2 | | | | | 3.0 |
| | Resin emulsion | Urethane 1 (active ingredient: 36% by mass) | 11.1 | 11.1 | 11.1 | | 11.1 |
| | | Urethane 2 (active ingredient: 40% by mass) | | | | 10.0 | |
| | | Urethane 3 (active ingredient: 38% by mass) | | | | | |
| | | Purified water | 22.9 | 22.9 | 22.9 | 24.0 | 22.9 |
| Continuous phase | Solution of oil-soluble resin A | Resin solution 6 (active ingredient: 50% by mass) | | | | | |
| | | Resin solution 7 (active ingredient: 50% by mass) | 6.0 | | | | 6.0 |
| | | Resin solution 8 (active ingredient: 50% by mass) | | 6.0 | | | |
| | | Resin solution 9 (active ingredient: 50% by mass) | | | 6.0 | | |
| | | Resin solution 5 (active ingredient: 50% by mass) | | | | 6.0 | |
| | Comparative dispersant | S28000 | | | | | |
| | | ES5600 | | | | | |
| | Non-aqueous solvent | Petroleum-based hydrocarbon solvent 1 | 20.0 | 20.0 | 25.0 | 31.0 | |
| | | Fatty acid ester-based solvent 1 | 41.0 | 41.0 | 36.0 | 50.0 | 41.0 |
| | | Fatty acid ester-based solvent 2 | | | | | 30.0 |
| | | Silicone oil 2 | 20.0 | 20.0 | 20.0 | | 10.0 |
| | Total (parts by mass) | | 130.0 | 130.0 | 130.0 | 130.0 | 130.0 |

TABLE 9

| (parts by mass) | | | Comparative Example 4 | Comparative Example 5 |
|---|---|---|---|---|
| Dispersed phase | Colorant | Carbon black 3 | 6.0 | |
| | | Dimethyl quinacridone pigment | | 6.0 |
| | | Copper phthalocyanine blue pigment | | |
| | | Direct dye | | |
| | Pigment dispersant | Water-soluble nonionic dispersant 1 | 3.0 | 3.0 |
| | | Water-soluble nonionic dispersant 2 | | |
| | Resin emulsion | Urethane 1 (active ingredient: 36% by mass) | 11.1 | 11.1 |
| | | Urethane 2 (active ingredient: 40% by mass) | | |
| | | Urethane 3 (active ingredient: 38% by mass) | | |
| | | Purified water | 22.9 | 22.9 |
| Continuous phase | Solution of oil-soluble resin A | Resin solution 6 (active ingredient: 50% by mass) | | |
| | | Resin solution 7 (active ingredient: 50% by mass) | | |
| | | Resin solution 8 (active ingredient: 50% by mass) | | |
| | | Resin solution 9 (active ingredient: 50% by mass) | | |
| | | Resin solution 5 (active ingredient: 50% by mass) | | |
| | Comparative dispersant | S28000 | 3.0 | |
| | | ES5600 | | 3.0 |
| | Non-aqueous solvent | Petroleum-based hydrocarbon solvent 1 | 20.0 | 34.0 |
| | | Fatty acid ester-based solvent 1 | 44.0 | 50.0 |
| | | Fatty acid ester-based solvent 2 | | |
| | | Silicone oil 2 | 20.0 | |
| Total (parts by mass) | | | 130.0 | 130.0 |

TABLE 10

| (% by mass) | | | Example 13 | Example 14 | Example 15 | Example 16 | Example 17 |
|---|---|---|---|---|---|---|---|
| Colored resin particles | Colorant | Carbon black 3 | 6 | | | 6 | |
| | | Dimethyl quinacridone pigment | | 6 | | | |
| | | Copper phthalocyanine blue pigment | | | 6 | | |
| | | Direct dye | | | | | 6 |
| | Pigment dispersant | Water-soluble nonionic dispersant 1 | 3 | 3 | 3 | 3 | |
| | | Water-soluble nonionic dispersant 2 | | | | | |
| | Resin | Urethane 1 | 4 | 4 | | 4 | 4 |
| | | Urethane 2 | | | | | |
| | | Urethane 3 | | | 4 | | |
| Solution of oil-soluble resin A | | Resin solution 6 (active ingredient: 50% by mass) | 6 | 6 | 6 | 6 | 6 |
| | | Resin solution 7 (active ingredient: 50% by mass) | | | | | |
| | | Resin solution 8 (active ingredient: 50% by mass) | | | | | |
| | | Resin solution 9 (active ingredient: 50% by mass) | | | | | |
| | | Resin solution 5 (active ingredient: 50% by mass) | | | | | |
| Comparative dispersant | | S28000 | | | | | |
| | | ES5600 | | | | | |
| Non-aqueous solvent | | Petroleum-based hydrocarbon solvent 1 | 20 | 20 | 20 | 31 | 30 |
| | | Fatty acid ester-based solvent 1 | 41 | 41 | 41 | 50 | 24 |
| | | Fatty acid ester-based solvent 2 | | | | | 30 |
| | | Silicone oil 2 | 20 | 20 | 20 | | |
| Total (% mass) | | | 100 | 100 | 100 | 100 | 100 |
| Discharge performance | | | S | S | S | S | S |
| Ink storage stability | | | S | S | S | S | S |
| Clear file deformation | | | S | S | S | A | A |
| Image density (printed surface OD value) | | | S | — | — | S | — |
| Image density (coloration, chroma) | | | — | S | S | — | S |
| Strike-through (rear surface OD value) | | | S | S | S | S | A |
| Roller transfer contamination | | | S | S | S | S | A |

TABLE 11

| (% by mass) | | | Example 18 | Example 19 | Example 20 | Example 21 | Example 22 |
|---|---|---|---|---|---|---|---|
| Colored resin particles | Colorant | Carbon black 3 | 6 | 6 | 6 | 6 | 6 |
| | | Dimethyl quinacridone pigment | | | | | |
| | | Copper phthalocyanine blue pigment | | | | | |
| | | Direct dye | | | | | |

TABLE 11-continued

| (% by mass) | | Example 18 | Example 19 | Example 20 | Example 21 | Example 22 |
|---|---|---|---|---|---|---|
| Pigment dispersant | Water-soluble nonionic dispersant 1 | 3 | 3 | 3 | 3 | |
| | Water-soluble nonionic dispersant 2 | | | | | 3 |
| Resin | Urethane 1 | 4 | 4 | 4 | | 4 |
| | Urethane 2 | | | | 4 | |
| | Urethane 3 | | | | | |
| Solution of oil-soluble resin A | Resin solution 6 (active ingredient: 50% by mass) | | | | | |
| | Resin solution 7 (active ingredient: 50% by mass) | 6 | | | | 6 |
| | Resin solution 8 (active ingredient: 50% by mass) | | 6 | | | |
| | Resin solution 9 (active ingredient: 50% by mass) | | | 6 | | |
| | Resin solution 5 (active ingredient: 50% by mass) | | | | 6 | |
| Comparative dispersant | S28000 | | | | | |
| | ES5600 | | | | | |
| Non-aqueous solvent | Petroleum-based hydrocarbon solvent 1 | 20 | 20 | 25 | 31 | |
| | Fatty acid ester-based solvent 1 | 41 | 41 | 36 | 50 | 41 |
| | Fatty acid ester-based solvent 2 | | | | | 30 |
| | Silicone oil 2 | 20 | 20 | 20 | | 10 |
| Total (% mass) | | 100 | 100 | 100 | 100 | 100 |
| Discharge performance | | S | S | S | S | S |
| Ink storage stability | | S | S | A | S | S |
| Clear file deformation | | S | S | S | A | S |
| Image density (printed surface OD value) | | S | S | A | A | S |
| Image density (coloration, chroma) | | — | — | — | — | — |
| Strike-through (rear surface OD value) | | S | A | S | S | S |
| Roller transfer contamination | | S | A | S | S | S |

TABLE 12

| (% by mass) | | Comparative Example 4 | Comparative Example 5 |
|---|---|---|---|
| Colored resin particles | Colorant | Carbon black 3 | 6 | |
| | | Dimethyl quinacridone pigment | | 6 |
| | | Copper phthalocyanine blue pigment | | |
| | | Direct dye | | |
| | Pigment dispersant | Water-soluble nonionic dispersant 1 | 3 | 3 |
| | | Water-soluble nonionic dispersant 2 | | |
| | Resin | Urethane 1 | 4 | 4 |
| | | Urethane 2 | | |
| | | Urethane 3 | | |
| | Solution of oil-soluble resin A | Resin solution 6 (active ingredient: 50% by mass) | | |
| | | Resin solution 7 (active ingredient: 50% by mass) | | |
| | | Resin solution 8 (active ingredient: 50% by mass) | | |
| | | Resin solution 9 (active ingredient: 50% by mass) | | |
| | | Resin solution 5 (active ingredient: 50% by mass) | | |
| Comparative dispersant | S28000 | 3 | |
| | ES5600 | | 3 |
| Non-aqueous solvent | Petroleum-based hydrocarbon solvent 1 | 20 | 34 |
| | Fatty acid ester-based solvent 1 | 44 | 50 |
| | Fatty acid ester-based solvent 2 | | |
| | Silicone oil 2 | 20 | |
| Total (% mass) | | 100 | 100 |
| Discharge performance | | Ink was not able to be produced | B |
| Ink storage stability | | | A |
| Clear file deformation | | | A |
| Image density (printed surface OD value) | | | — |
| Image density (coloration, chroma) | | | — |
| Strike-through (rear surface OD value) | | | B |
| Roller transfer contamination | | | B |

As is evident from Tables 10 to 12, the inks of Examples 13 to 22 which contained colored resin particles also exhibited excellent discharge properties. In Comparative Examples 4 and 5, which did not contain an oil-soluble resin A that is an acrylic-based polymer having a side chain containing a polydimethylsiloxane structure, either the ink was not able to be produced, or the discharge performance was inferior.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:
1. An oil-based inkjet ink comprising:
a colorant,
an oil-soluble resin that is an acrylic-based polymer having a side chain containing a polydimethylsiloxane structure, and a non-aqueous solvent, wherein the oil-soluble resin has at least one selected from the group consisting of a β-dicarbonyl group and a benzyl group.

2. The oil-based inkjet ink according to claim 1, wherein the non-aqueous solvent comprises a silicone oil.

3. The oil-based inkjet ink according to claim 2, wherein the silicone oil comprises an alkyl-modified silicone oil.

4. The oil-based inkjet ink according to claim 2, wherein the non-aqueous solvent comprises the silicone oil in an amount of 10 to 100% by mass relative to a total mass of the non-aqueous solvent.

5. The oil-based inkjet ink according to claim 1, wherein within the oil-soluble resin, an amount of a structural unit having a side chain containing the polydimethylsiloxane structure, relative to a total of all structural units of the oil-soluble resin, is from 10 to 40% by mass.

6. The oil-based inkjet ink according to claim 1, further comprising colored resin particles containing the colorant and a resin.

7. The oil-based inkjet ink according to claim 6, wherein the resin of the colored resin particles comprises an acidic resin.

8. The oil-based inkjet ink according to claim 1, wherein the oil-soluble resin has a basic group.

9. The oil-based inkjet ink according to claim 1, wherein the oil-soluble resin has the β-dicarbonyl group.

10. A method for producing an oil-based inkjet ink, the method comprising:

producing a water-in-oil emulsion comprising a continuous phase containing a non-aqueous solvent and an oil-soluble resin that is an acrylic-based polymer having a side chain containing a polydimethylsiloxane structure, and a dispersed phase containing water, a colorant and a water-dispersible resin, and removing the water from the water-in-oil emulsion, wherein the oil-soluble resin has at least one selected from the group consisting of a β-dicarbonyl group and a benzyl group.

11. The method for producing an oil-based inkjet ink according to claim 10, wherein the non-aqueous solvent comprises a silicone oil.

12. The method for producing an oil-based inkjet ink according to claim 11, wherein the silicone oil comprises an alkyl-modified silicone oil.

13. The method for producing an oil-based inkjet ink according to claim 11, wherein the non-aqueous solvent comprises the silicone oil in an amount of 10 to 100% by mass relative to a total mass of the non-aqueous solvent.

14. The method for producing an oil-based inkjet ink according to claim 10, wherein within the oil-soluble resin, an amount of a structural unit having a side chain containing the polydimethylsiloxane structure, relative to a total of all structural units of the oil-soluble resin, is from 2 to 80% by mass.

15. The method for producing an oil-based inkjet ink according to claim 10, wherein the water-dispersible resin comprises an acidic water-dispersible resin.

16. The method for producing an oil-based inkjet ink according to claim 10, wherein the oil-soluble resin has a basic group.

17. The method for producing an oil-based inkjet ink according to claim 10, wherein the oil-soluble resin has the β-dicarbonyl group.

* * * * *